United States Patent
Manabe et al.

(10) Patent No.: US 7,678,431 B2
(45) Date of Patent: *Mar. 16, 2010

(54) PHOTOSTABLE LIQUID-CRYSTALLINE MEDIUM

(75) Inventors: Atsutaka Manabe, Bensheim (JP);
Ulrich Heywang, Darmstadt (DE);
Detlef Pauluth, Ober-Ramstadt (DE);
Michael Heckmeier, Hemsbach (DE);
Peer Kirsch, Seeheim-Jugenheim (DE);
Elvira Montenegro, Weinheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/739,537

(22) Filed: Apr. 24, 2007

(65) Prior Publication Data

US 2007/0237907 A1    Oct. 11, 2007

Related U.S. Application Data

(62) Division of application No. 10/531,376, filed on Apr. 15, 2005, now Pat. No. 7,211,302.

(51) Int. Cl.
*C09K 19/12* (2006.01)
(52) U.S. Cl. .................... 428/1.1; 252/299.66
(58) Field of Classification Search ........... 252/299.01, 252/299.63, 299.66; 428/1.1
See application file for complete search history.

(56) References Cited

U.S. PATENT DOCUMENTS

| | | | |
|---|---|---|---|
| 5,342,544 A | 8/1994 | Naito et al. | |
| 5,762,828 A | 6/1998 | Tanaka et al. | |
| 5,874,022 A | 2/1999 | Kubo et al. | |
| 5,948,319 A | 9/1999 | Tanaka et al. | |
| 6,210,603 B1 | 4/2001 | Kondo et al. | |
| 6,936,312 B2 | 8/2005 | Torii et al. | |
| 7,001,646 B2 * | 2/2006 | Heckmeier et al. | 428/1.1 |
| 7,211,302 B2 * | 5/2007 | Manabe et | 428/1.1 |
| 7,390,538 B2 * | 6/2008 | Manabe et al. | 428/1.1 |
| 2002/0038859 A1 * | 4/2002 | Heckmeier et al. | 252/299.63 |
| 2002/0060311 A1 | 5/2002 | Tarumi et al. | |
| 2002/0061368 A1 * | 5/2002 | Tarumi et al. | 428/1.1 |
| 2002/0119262 A1 | 8/2002 | Hirschmann et al. | |
| 2002/0182345 A1 * | 12/2002 | Ichinose et al. | 428/1.1 |
| 2003/0134056 A1 | 7/2003 | Heckmeier et al. | |
| 2003/0222244 A1 | 12/2003 | Torii et al. | |
| 2003/0228426 A1 | 12/2003 | Heckmeier et al. | |

FOREIGN PATENT DOCUMENTS

| | | |
|---|---|---|
| DE | 19720529 | 12/1997 |
| DE | 19919348 | 11/1999 |
| DE | 10128017 | 3/2002 |
| DE | 10152831 | 7/2002 |
| DE | 10204607 | 8/2003 |
| EP | 0832955 | 4/1998 |
| EP | 0949231 | 10/1999 |
| EP | 121339 | 6/2002 |
| EP | 1352944 | 10/2003 |
| GB | 2240778 | 8/1991 |
| GB | 2296253 | 6/1996 |
| WO | WO 9009420 | 8/1990 |
| WO | WO 0112751 | 2/2001 |
| WO | WO 02051963 | 7/2002 |

* cited by examiner

*Primary Examiner*—Shean C Wu
(74) *Attorney, Agent, or Firm*—Millen, White, Zelano, Branigan, P.C.

(57) ABSTRACT

The invention relates to a photostable liquid-crystalline medium comprising
at least one compound of the formula I

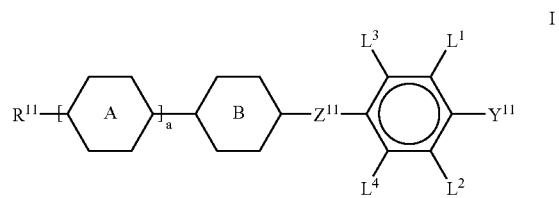

and
at least one compound of the formula II

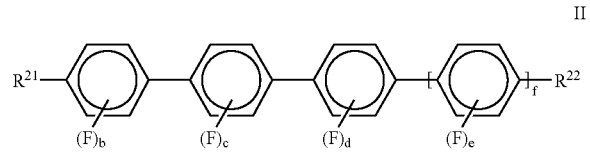

and to the use thereof for electro-optical purposes, and to displays containing this medium.

10 Claims, No Drawings

PHOTOSTABLE LIQUID-CRYSTALLINE MEDIUM

This application is a divisional of U.S patent application Ser. No. 10/531,376, filed Apr. 15, 2005, now U.S. Pat. No. 7,211,302, which is incorporated by reference herein.

The present invention relates to a photostable liquid-crystalline medium, to the use thereof for electro-optical purposes, and to displays containing this medium.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and lower vapour pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:

1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electrooptical effect used is usually the TN effect. A distinction is made between two technologies: TFTs comprising compound semiconductors, such as, for example, CdSe, or TFTs based on polycrystalline or amorphous silicon. Intensive work is being carried out world-wide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are illuminated from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKOGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p.141 ff, Paris; STROMER, M., Proc. Eurodisplay 84, September 1984: Design of Thin Film Transistors for Matrix Addressing of Television Liquid Crystal Displays, p.145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and the lowest possible sensitivity on heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art do not meet today's requirements.

There thus continues to be a great demand for MLC displays having very high specific resistance at the same time as a large working-temperature range, short response times even at low temperatures and low threshold voltage which do not have these disadvantages, or only do so to a reduced extent.

Numerous liquid-crystal mixtures used in MLC displays comprise compounds having limited photostability. Although these compounds are generally stable to natural light—even over an extended period—and can usually also be exposed to UV irradiation for some time without this resulting in decomposition of individual mixture constituents, exposure of the mixtures to, in particular, intense UV radiation for an extended period can result, however, in undesired photochemical processes which partially decompose the compounds of limited photostability and can thus modify the liquid-crystal mixtures in their composition and in their properties in a sensitive manner or even render them unusable. This problem has intensified recently through the fact that the so-called "one-drop filling method" [H. Kamiya, K. Tajima, K. Toriumi, K. Terada, H. Inoue, T. Yokoue, N. Shimizu, T. Kobayashi, S. Odahara, G. Hougham, C. Cai, J. H. Glownia, R. J. von Gutfeld, R. John, S.-C. Alan Lien, *SID* 01 *Digest* (2001), 1354-1357], during the use of which the display cells filled with a liquid-crystal mixture are irradiated with UV light for an extended period in order to effect polymerisation of the monomers used as sealing agent (for example acrylates or epoxides) in order to seal the cells, is now being employed in the manufacture of liquid-crystal displays.

Compounds having a —(CH$_2$)$_2$—, —COO—, —CH=CH—, —CF=CH—, —CH=CF—, —CF=CF—, —C≡C— or —CF$_2$O— link between two ring constituents of the molecule, which are frequently apparently mesogenic, are comparatively sensitive to UV radiation. It is therefore also desirable to improve the photostability of liquid-crystal mixtures without impairing their above-mentioned properties which are necessary, in particular, for use in MLC displays.

In TN (Schadt-Helfrich) cells, media are desired which facilitate the following advantages in the cells:
  extended nematic phase range (in particular down to low temperatures)
  a long shelf life, even at extremely low temperatures
  the ability to switch at extremely low temperatures (outdoor use, automobile, avionics)
  increased resistance to UV radiation (longer life).

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention is based on the object of providing media, in particular for MLC, TN or STN displays of this type, which do not have the above-mentioned disadvantages, or only do so to a reduced extent, and preferably at the same time have very low threshold voltages and at the same time high values for the voltage holding ratio (VHR) and have improved stability to UV radiation.

It has now been found that this object can be achieved if media according to the invention are used in displays.

The invention thus relates to a liquid-crystalline medium comprising
  at least one compound of the formula I

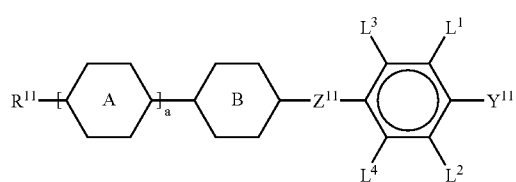

I and
at least one compound of the formula II

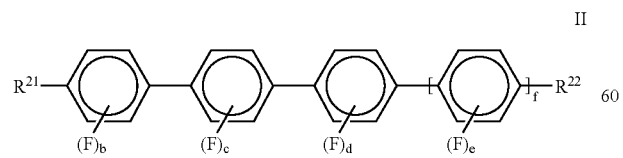

II in which
$L^1$, $L^2$, $L^3$ and $L^4$ are each, independently of one another, H or F;

$R^{11}$ is H, a halogenated or unsubstituted alkyl radical having from 1 to 15 carbon atoms, where, in addition, one or more CH$_2$ groups in these radicals may each be replaced, independently of one another, by —C≡C—, —CH=CH—, —O—, —CO—O— or —O—CO— in such a way that O atoms are not linked directly to one another;

$R^{21}$ and $R^{22}$ are each, independently of one another, H, Cl, F, CN, SF$_5$, SCN, NCS, a halogenated or unsubstituted alkyl radical having from 1 to 15 carbon atoms, where, in addition, one or more CH$_2$ groups in these radicals each may be replaced, independently of one another, by —C≡C—, —CH=CH—, —O—, —CO—O— or —O—CO— in such a way that O atoms are not linked directly to one another;

$Y^{11}$ is F, Cl, CN, SF$_5$, SCN, NCS, a halogenated alkyl radical, a halogenated alkenyl radical, a halogenated alkoxy radical or a halogenated alkenyloxy radical, each having up to 6 carbon atoms;

$Z^{11}$ is a single bond, —CH$_2$—CH$_2$—, —CH=CH—, —CH=CF—, —CF=CH—, —CF=CF—, —C≡C—, —COO—, —OCO—, —CF$_2$O— or —OCF$_2$—;

a and f, independently of one another, are 0 or 1;

b, c, d and e are each, independently of one another, 0, 1 or 2;

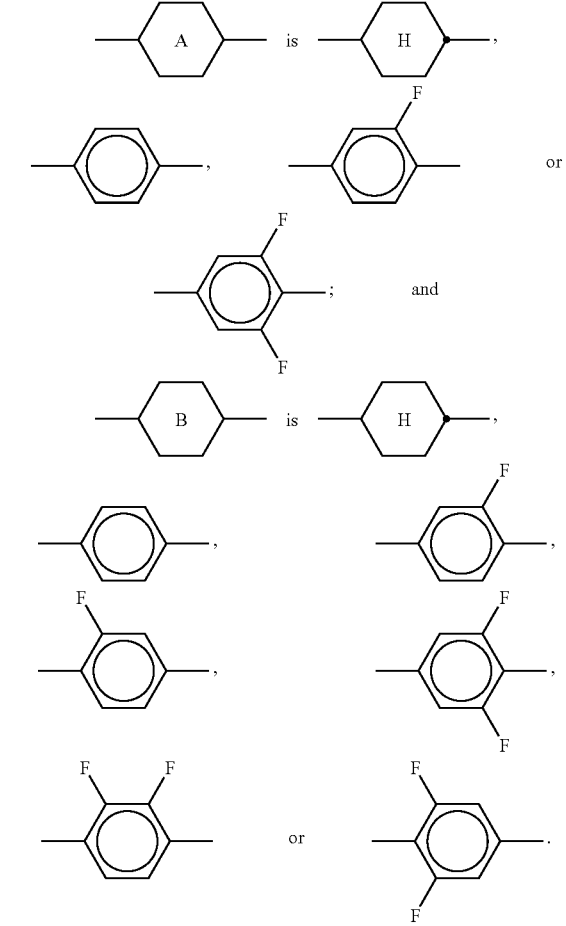

Particular preference is given to a liquid-crystalline medium according to the invention comprising at least one compound of the formula IA

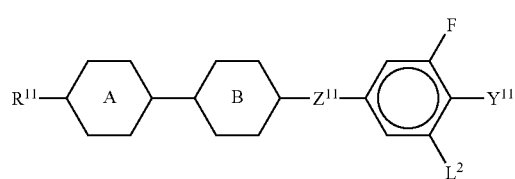

and
at least one compound of the formula II

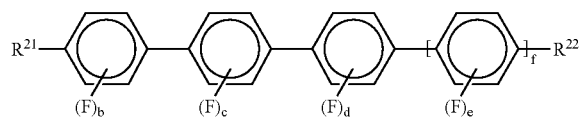

in which $L^2$ is H or F;

$R^{11}$ is H, a halogenated or unsubstituted alkyl radical having from 1 to 15 carbon atoms, where, in addition, one or more $CH_2$ groups in these radicals may each be replaced, independently of one another, by —C≡C—, —CH=CH—, —O—, —CO—O— or —O—CO— in such a way that O atoms are not linked directly to one another;

$R^{21}$ and $R^{22}$ are each, independently of one another, H, Cl, F, CN, $SF_5$, SCN, NCS, a halogenated or unsubstituted alkyl radical having from 1 to 15 carbon atoms, where, in addition, one or more $CH_2$ groups in these radicals may each be replaced, independently of one another, by —C≡C—, —CH=CH—, —O—, —CO—O— or —O—CO— in such a way that O atoms are not linked directly to one another;

$Y^{11}$ is F, Cl, CN, $SF_5$, SCN, NCS, a halogenated alkyl radical, a halogenated alkenyl radical, a halogenated alkoxy radical or a halogenated alkenyloxy radical, each having up to 6 carbon atoms;

$Z^{11}$ is a single bond, —COO— or —$CF_2O$—;

f is 0 or 1;

b, c, d and e are each, independently of one another, 0, 1 or 2;

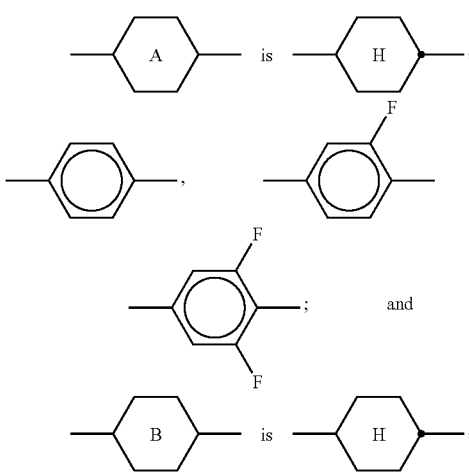

-continued

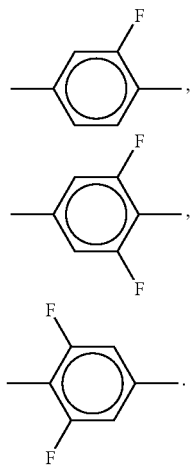

(If $Z^{11}$ in the formula I or IA is a single bond and f in the formula II is zero, these compounds of the formula I or IA on the one hand and of the formula II on the other hand which are present in the medium according to the invention are selected in such a way that they are not identical.)

It is preferred for the liquid-crystalline medium according to the invention to form the basis of a mixture of polar compounds of positive dielectric anisotropy or to be a constituent of such a mixture. The compounds of the formulae I and II have a broad range of applications. Depending on the choice of substituents, these compounds can either be used as base materials of which liquid-crystalline media are predominantly composed; however, it is also possible to add compounds of the formulae I and II to liquid-crystalline base materials from other classes of compound in order, for example, to modify the dielectric and/or optical anisotropy of a dielectric of this type and/or to optimise its threshold voltage and/or its viscosity and in particular to improve its photostability.

The liquid-crystalline medium of the present invention comprising the compounds of the formulae I and II proves to be particularly advantageous with respect to the UV stability of liquid-crystal mixtures.

In the pure state, the compounds of the formulae I and II are colourless and form liquid-crystalline mesophases in a temperature range which is favourably located for electro-optical use.

If $R^{11}$, $R^{21}$ and/or $R^{22}$ is an alkyl radical and/or an alkoxy radical (i.e. an alkyl radical in which (at least) the —$CH_2$— group via which $R^{11}$, $R^{21}$ or $R^{22}$ respectively is bonded to the ring in question has been replaced by O), this may be straight-chain or branched. It is preferably straight-chain, has 1, 2, 3, 4, 5, 6 or 7 carbon atoms and accordingly is preferably methyl, ethyl, propyl, butyl, pentyl, hexyl, heptyl, methoxy, ethoxy, propoxy, butoxy, pentoxy, hexyloxy or heptyloxy, furthermore octyl, nonyl, decyl, undecyl, dodecyl, tridecyl, tetradecyl, pentadecyl, octyloxy, nonyloxy, decyloxy, undecyloxy, dodecyloxy, tridecyloxy or tetradecyloxy.

Oxaalkyl—i.e. an alkyl chain in which at least one $CH_2$ group has been replaced by O, but where the oxygen atom is not bonded directly to the ring substituted by $R^{11}$, $R^{21}$ or $R^{22}$—is preferably straight-chain 2-oxapropyl (=methoxymethyl), ethoxymethyl or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, -4-, 5-, 6-, 7- or 8-oxanonyl, or 2-, 3-, 4-, 5-, 6-, 7-, 8- or 9-oxadecyl.

If $R^{11}$, $R^{21}$ and/or $R^{22}$ is an alkyl radical in which one CH$_2$ group has been replaced by —CH=CH—, this may be straight-chain or branched. A radical of this type is also known as an alkenyl radical. It is preferably straight-chain and has from 2 to 10 carbon atoms. Accordingly, it is particularly preferably vinyl, prop-1- or -2-enyl, but-1-, -2- or -3-enyl, pent-1-, -2-, -3- or 4-enyl, hex-1-, -2-, -3-, -4- or -5-enyl, hept-1-, -2-, -3-, -4-, -5- or -6-enyl, oct-1-, -2-, -3-, 4-, -5-, -6- or -7-enyl, non-1-, -2-, -3-, 4-, -5-, -6-, -7- or -8-enyl, or dec-1-, -2-, -3-, -4-, -5-, -6-, -7-, -8- or -9-enyl. If the alkenyl group can have the E or Z configuration, the E configuration (trans configuration) is generally preferred.

If $R^{11}$, $R^{21}$ and/or $R^{22}$ is an alkyl radical in which one CH$_2$ group has been replaced by —O— and one has been replaced by —CO—, these are preferably adjacent. These thus contain an acyloxy group —CO—O— or an oxycarbonyl group —O—CO—. These are preferably straight-chain and have from 2 to 6 carbon atoms. Accordingly, they are in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If $R^{11}$, $R^{21}$ and/or $R^{22}$ is an alkyl radical in which one CH$_2$ group has been replaced by unsubstituted or substituted —CH=CH— and an adjacent CH$_2$ group has been replaced by CO, CO—O or O—CO, this may be straight-chain or branched. It is preferably straight-chain and has from 4 to 12 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryoyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If $R^{11}$, $R^{21}$ and/or $R^{22}$ is an alkyl, alkoxy or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position. Particular preference is given to —CF$_3$, —CHF$_2$, —CH$_2$F, —CH$_2$CF$_3$, —CHFCHF$_2$, —CF$_2$CF$_3$, —OCF$_3$, —OCHF$_2$, —OCH$_2$F and —CF=CF$_2$.

Compounds containing branched wing groups $R^{11}$, $R^{21}$ and/or $R^{22}$ may occasionally be of importance owing to better solubility in the usual liquid-crystalline base materials, but in particular as chiral dopants if they are optically active. Smectic compounds of this type are suitable as components of ferroelectric materials.

Branched groups of this type preferably contain not more than one chain branch. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If $R^{11}$, $R^{21}$ and/or $R^{22}$ is an alkyl radical in which two or more CH$_2$ groups have been replaced by —O— and/or —CO—O—, this may be straight-chain or branched. It is preferably branched and has from 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)pentyl.

$R^{21}$ and $R^{22}$ may also, independently of one another, be F, Cl, CN, SF$_5$, SCN or NCS, in particular F or Cl.

If $Y^{11}$ is a halogenated alkyl, alkenyl, alkoxy or alkenyloxy radical, this radical may be straight-chain or branched. The radical is preferably straight-chain, and is substituted by F or Cl. In the case of polysubstitution, halogen is in particular F. The substituted radicals also include perfluorinated radicals. In the case of monosubstitution, the halogen substituent may be in any desired position, preferably in the ω-position. $Y^{11}$ is particularly preferably F, Cl, CF$_3$, OCHF$_2$ or OCF$_3$, in particular F.

$Z^{11}$ is a single bond or is —CH$_2$—CH$_2$—, —CH=CH—, —CH=CF—, —CF=CH—, —CF=CF—, —C≡C—, —COO—, —OCO—, —CF$_2$O— or —OCF$_2$—. $Z^{11}$ is preferably a single bond or is —COO— or —CF$_2$O—; $Z^{11}$ is particularly preferably —CF$_2$O—.

In the compounds of the formula I and of the formula IA,

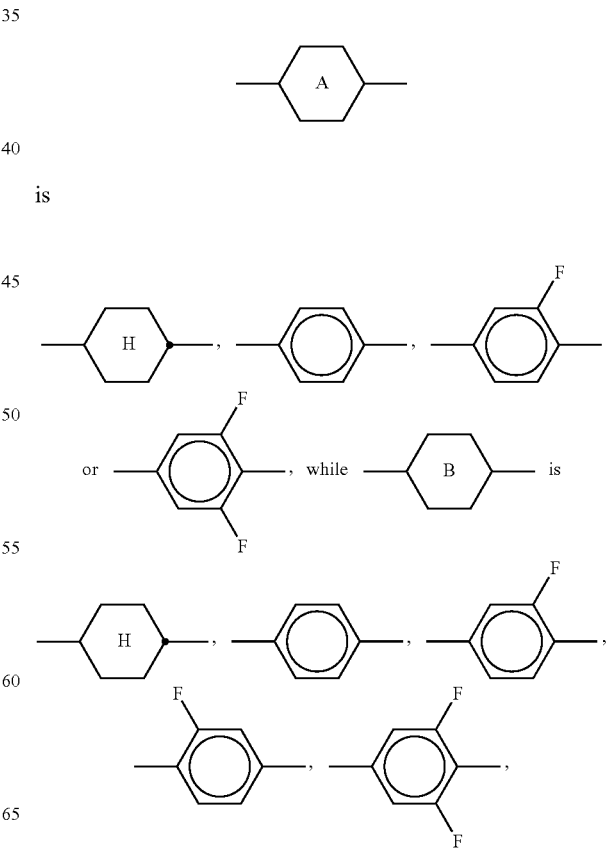

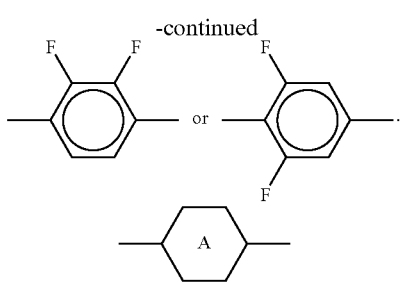

is preferably a 1,4-cyclohexylene or 1,4-phenylene ring, while

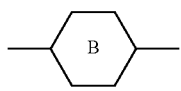

is preferably a 1,4-phenylene ring which is unsubstituted or monosubstituted or polysubstituted by fluorine.

a in the formula I can be 0 or 1. a is particularly preferably 1.

If f in the formula II is zero, the compounds of the formula II are terphenyls, which—depending on the meaning of b, c and d—may also carry one or more fluorine substituents. If, by contrast, f in the formula II is 1, the compounds of the formula II are in the form of quaterphenyls, which may themselves—depending on the meaning of b, c, d and e—be monosubstituted or polysubstituted by fluorine. It is also possible for the liquid-crystalline media according to the invention simultaneously to comprise at least one terphenyl and one quaterphenyl of the formula II. The media according to the invention preferably comprise either terphenyls of the formula II (f=0) or quaterphenyls of the formula II (f=1). If f=0, at least one or two of b, c and d is/are preferably 1 or 2. If f=1, e for compounds of the formula II is preferably 0, i.e. the corresponding phenyl ring is not substituted by F, while at least two of b, c and d are preferably 1 or 2. In a preferred embodiment of the invention, b, c, d and e are selected in such a way that b+c+d+e≧3; the sum of the lateral fluorine substituents of compounds of the formula II is particularly preferably 3, 4, 5 or 6.

The compounds of the formulae I and II are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The compounds of the formula II can, for example, also be built up by Suzuki cross-coupling—which can also be carried out consecutively—of corresponding aromatic boronic acids or boronic acid esters with suitably substituted phenyl compounds. Scheme 1 shows by way of example synthetic routes for the preparation of compounds of the formula II via Suzuki cross-coupling. $R^{21}$, $R^{22}$, b, c, d and e here are as defined above for the formula II. M is Si, Ge or Sn. Further preparation processes are described, inter alia, in German Patent Application 10211597.4 and European Patent Application 03003811.1.

Scheme 1

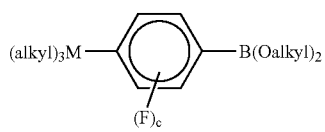

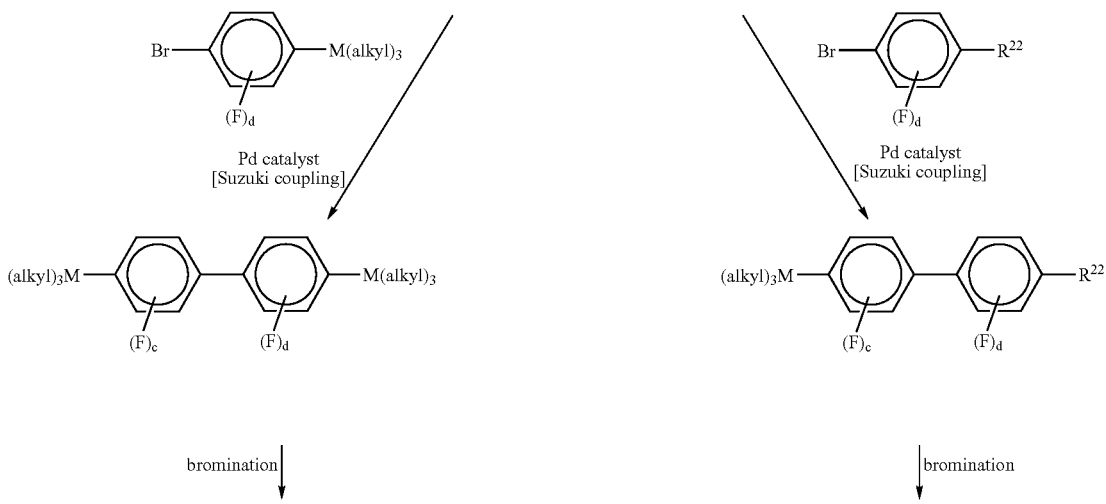

-continued

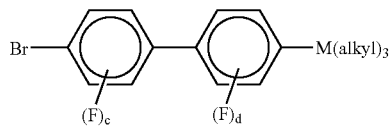

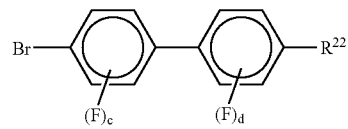

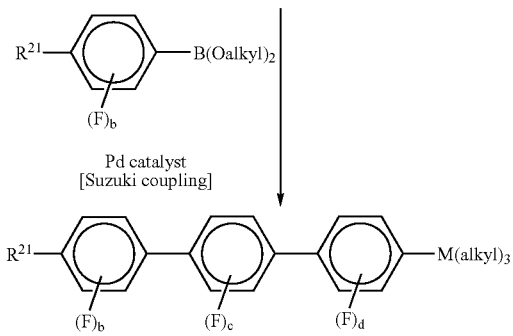

II where f = 0

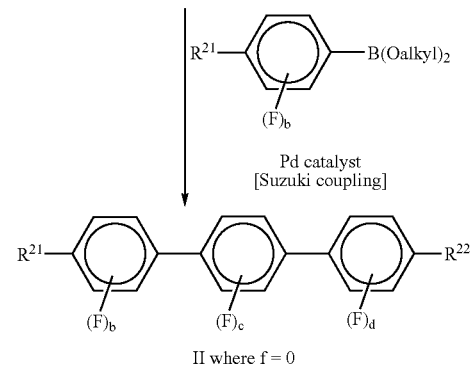

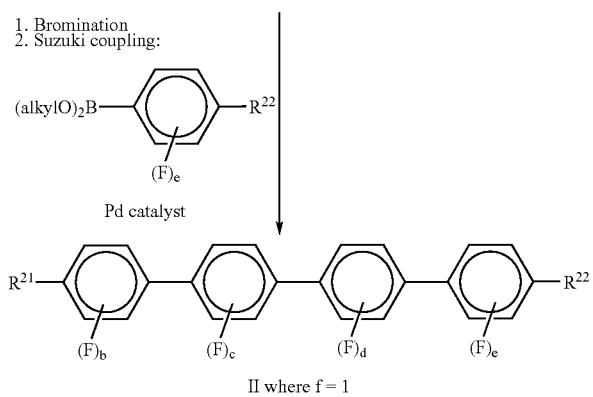

II where f = 1

The invention also relates to electro-optical displays (in particular STN or MLC displays having two plane-parallel outer plates which, together with a frame, form a cell, integrated non-linear elements for switching individual pixels on the outer plates, and a nematic liquid-crystal mixture of positive dielectric anisotropy and high specific resistance located in the cell) which contain media of this type, and to the use of these media for electro-optical purposes.

The liquid-crystal mixtures according to the invention enable a significant broadening of the available parameter latitude. The achievable combinations of clearing point, viscosity at low temperature, thermal and UV stability and dielectric anisotropy far exceed previous materials from the prior art.

In particular, the UV stability of the liquid-crystal media according to the invention is significantly improved compared with the known materials of the prior art, with the further desired or necessary parameters generally not only not being impaired, but likewise being significantly improved. Thus, in liquid-crystalline mixtures comprising the liquid-crystal medium according to the invention, a smaller drop in the voltage holding ratio (VHR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] after UV irradiation is observed than in the case of conventional mixtures. A comparable situation also applies to the change in the specific resistance (SR) of the mixtures as a consequence of UV treatment: liquid-crystal mixtures which comprise the liquid-crystalline medium according to the invention have a significantly higher specific resistance after UV treatment and prove to be less radiation-sensitive than mixtures without the medium according to the invention.

Liquid-crystal mixtures whose photostability may be reduced after addition of a compound of the formula I where $Z^{11}$=—$(CH_2)_2$—, —COO—, —OCO—, —CH=CH—, —CF=CH—, —CH=CF—, —CF=CF—, —C≡C—, —$OCF_2$— or —$CF_2O$— also exhibit significantly improved UV stability if, besides the compound (or compounds) of the formula I (or IA), at least one compound of the formula II as defined above is employed in these mixtures.

The combination of the compounds of the formulae I and II seems to influence the various parameters of relevance for use in electro-optical displays in their combination very much better than known materials from the prior art.

The mixtures according to the invention are preferably suitable as TN-TFT mixtures for notebook PC applications with 3.3 and 2.5 V drivers. They can also be used as TFT mixtures for projection applications, both in transmissive and in reflective mode.

The requirement for a high clearing point, a nematic phase at low temperature and a high Δε has hitherto only been achieved to an inadequate extent. The liquid-crystal mixtures according to the invention, while retaining the nematic phase down to −20° C. and preferably down to −30° C., particularly preferably down to −40° C., enable a clearing point above 60° C., preferably above 65° C., particularly preferably above 70° C., simultaneously usually dielectric anisotropy values Δε of ≧6, preferably ≧8, and a high value for the specific resistance to be achieved, enabling excellent STN and MLC displays to be obtained. In particular, the mixtures are characterised by low operating voltages. The TN thresholds are below 2.0 V, preferably below 1.5 V, particularly preferably <1.3 V.

It goes without saying that, through a suitable choice of the components of the mixtures according to the invention, it is also possible for higher clearing points (for example above 110°) to be achieved at a higher threshold voltage or lower clearing points to be achieved at lower threshold voltages with retention of the other advantageous properties. At viscosities correspondingly increased only slightly, it is likewise possible to obtain mixtures having greater Δε and thus lower thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975] are used, where, besides particularly favourable electro-optical properties, such as, for example, high steepness of the characteristic line and low angle dependence of the contrast (German Patent 3,022,818), a lower dielectric anisotropy is sufficient at the same threshold voltage as in an analogous display at the second minimum. This enables very high specific resistances to be achieved using the mixtures according to the invention at the first minimum. Through a suitable choice of the individual components and their proportions by weight, the person skilled in the art is able to set the birefringence necessary for a pre-specified layer thickness of the MLC display using simple routine methods.

The nematic phase range is preferably at least 90° C., in particular at least 100° C. This range preferably extends at least from −20° to +80° C.

A short response time is desired in liquid-crystal displays. This applies in particular to displays which are capable of video reproduction. For displays of this type, response times (total: $t_{on}+t_{off}$) of at most 16 ms are required. The upper limit of the response time is determined by the image refresh frequency.

The formula I preferably covers compounds of the formula IA, in particular the following compounds:

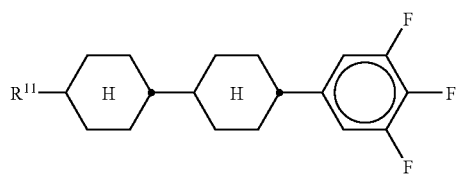

IA1

-continued

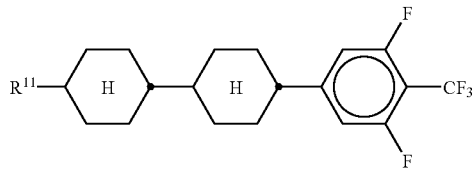

IA2

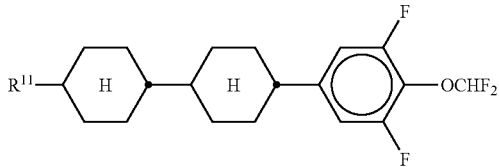

IA3

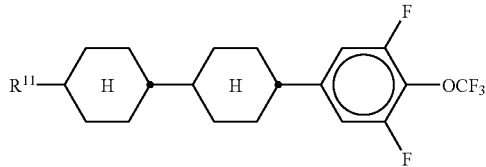

IA4

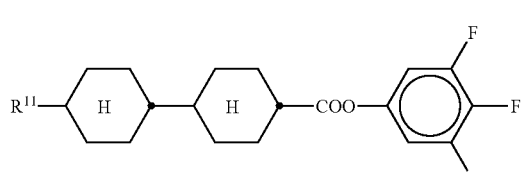

IA5

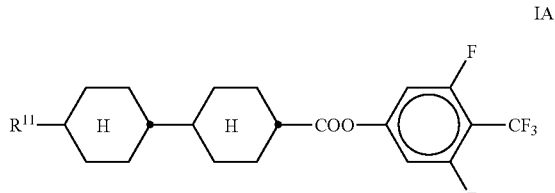

IA6

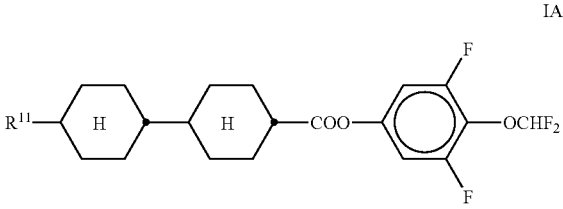

IA7

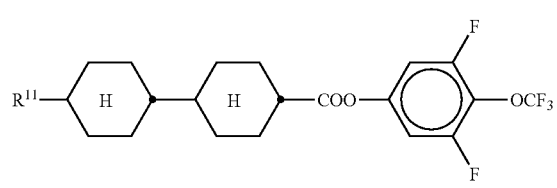

IA8

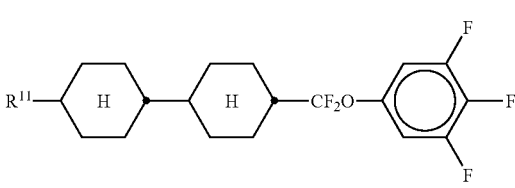

IA9

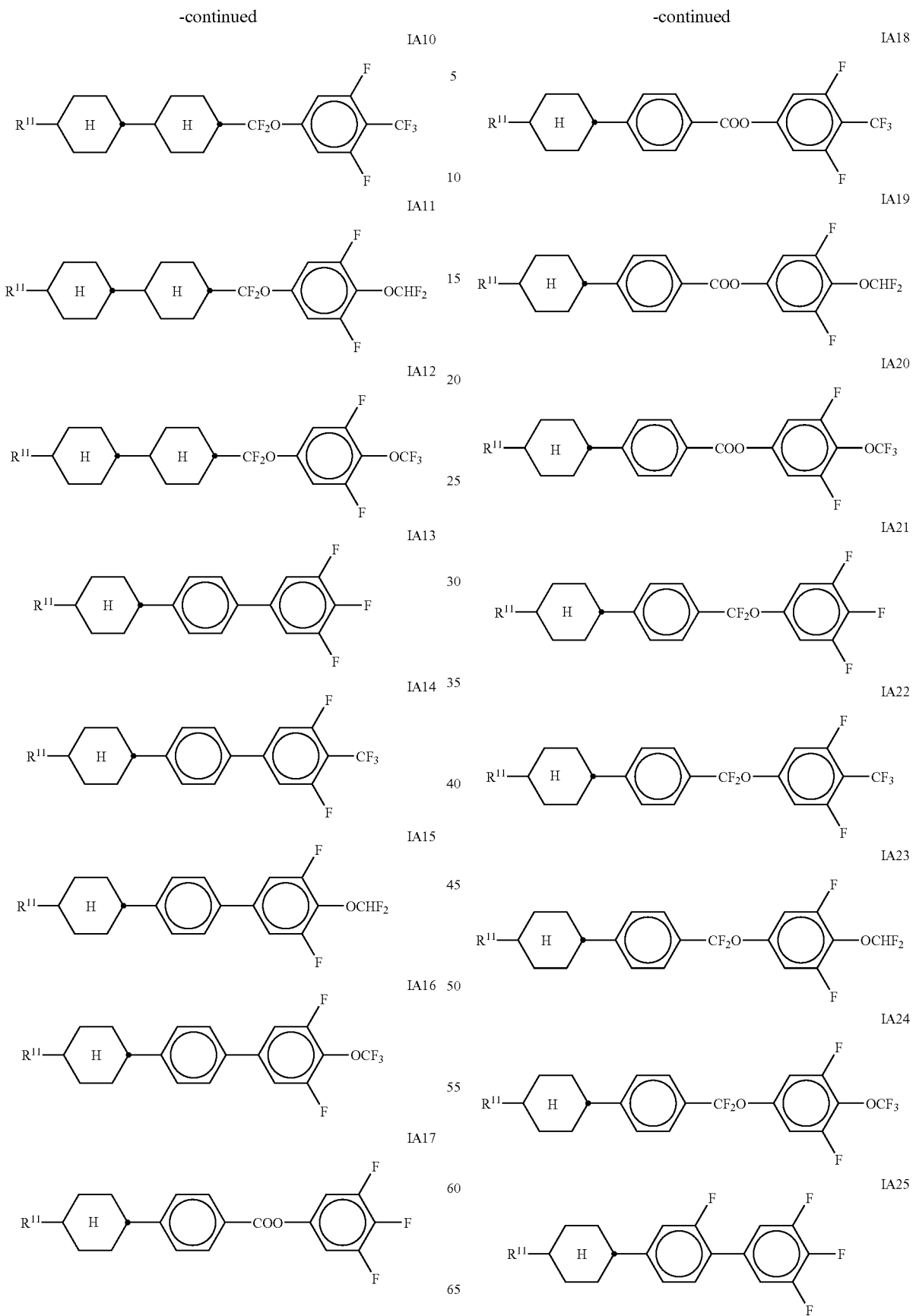

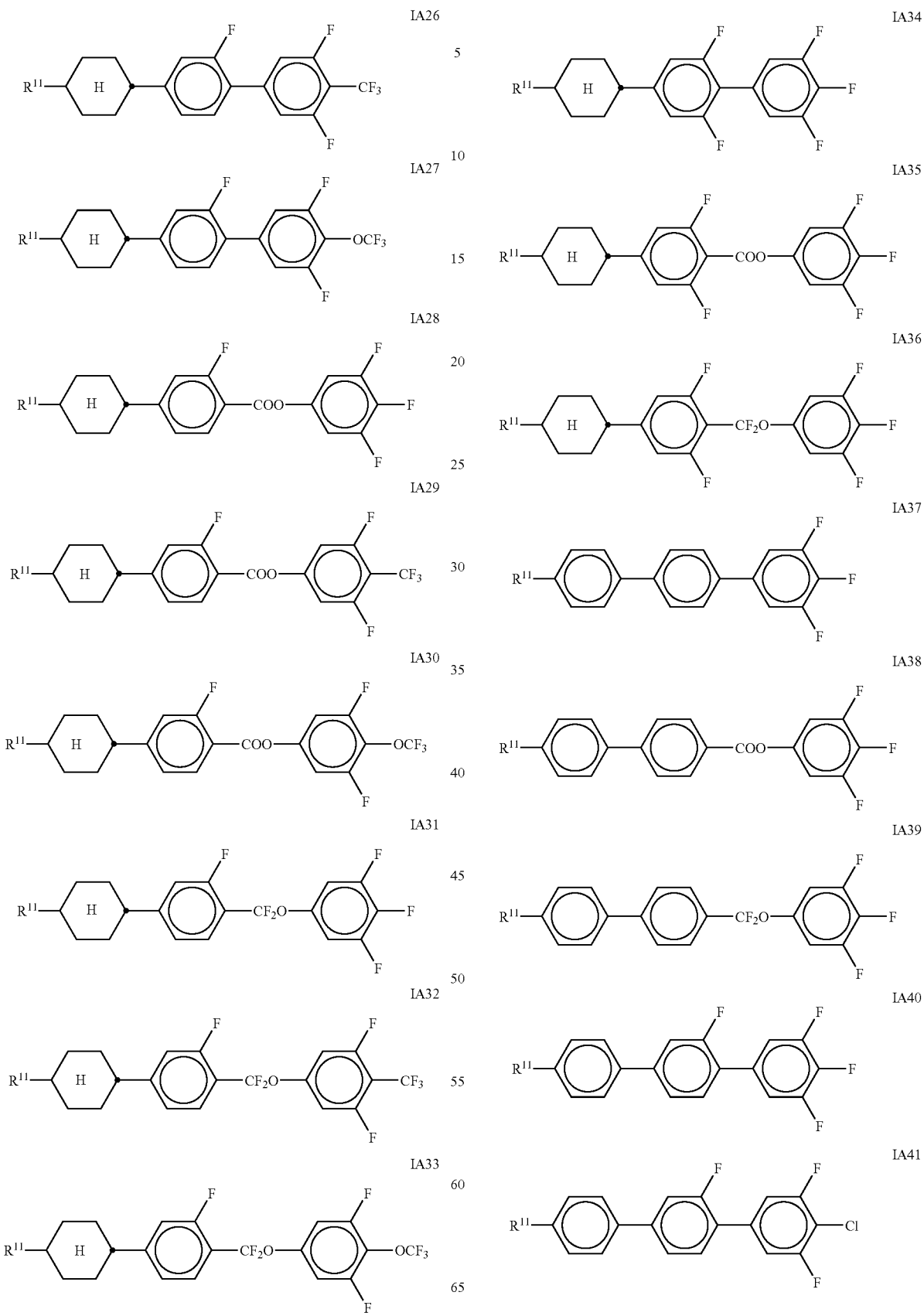

-continued
IA42
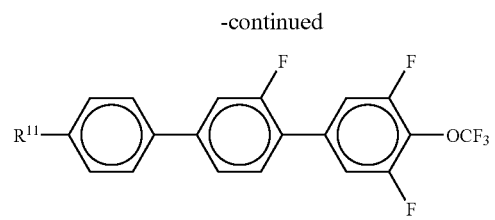
IA43
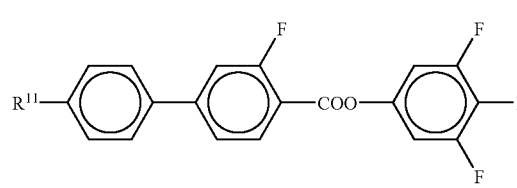
IA44
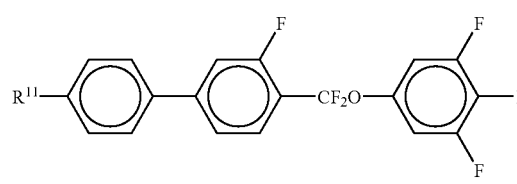
IA45
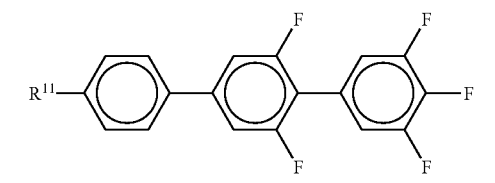
IA46
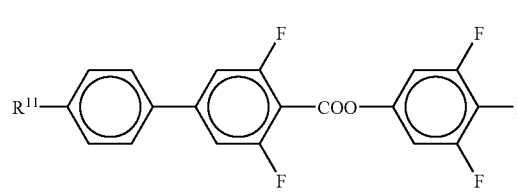
IA47
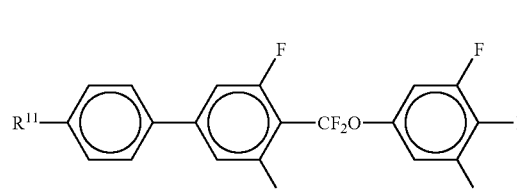
IA48
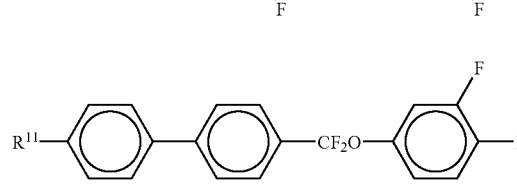
IA49
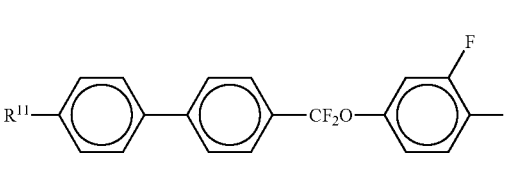
IA50
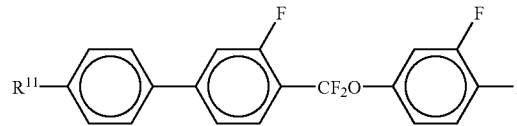
-continued
IA51
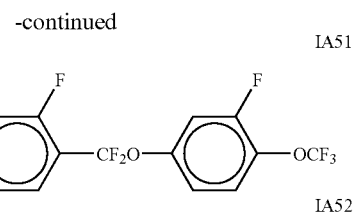
IA52
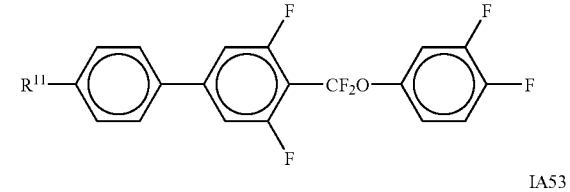
IA53
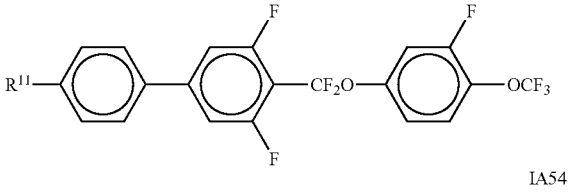
IA54
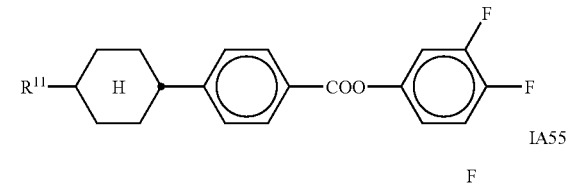
IA55
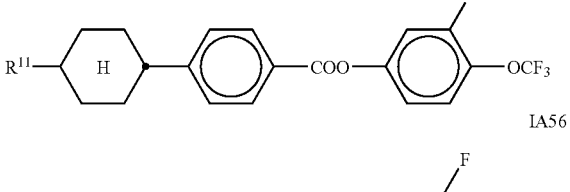
IA56
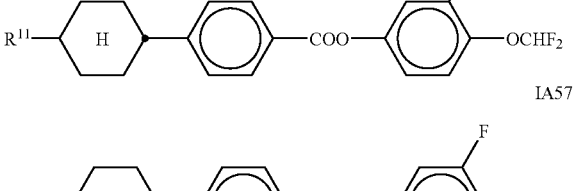
IA57
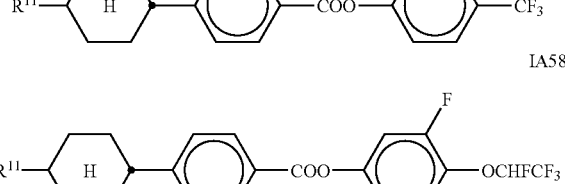
IA58
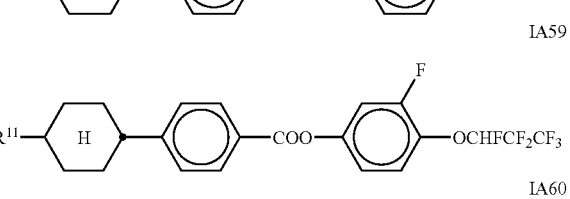
IA59
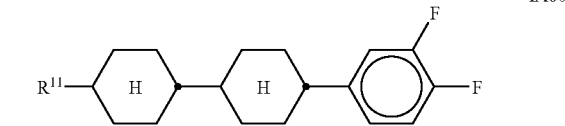
IA60

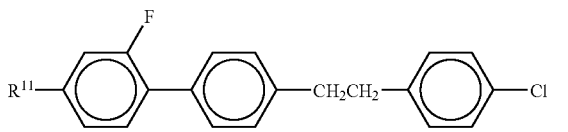
IA61

IA62

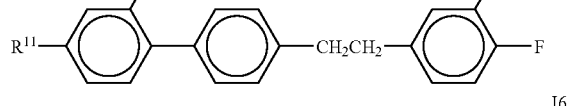
IA63

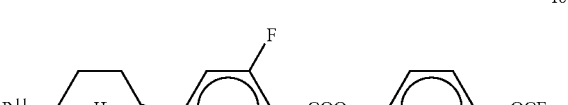
IA64 in which R[11] is as defined above for the formulae I and IA. R[11] is preferably $CH_3$, $C_2H_5$, n-$C_3H_7$, n-$C_4H_9$, n-$C_5H_{11}$, n-$C_6H_{13}$, n-$C_7H_{15}$, $CH_2$=CH, $CH_3CH$=CH or 3-alkenyl (i.e. an alkenyl radical which has the C=C double bond in the 3-position, such as, for example, in $CH_2$=CH—$CH_2$—$CH_2$—), in particular $C_2H_5$, n-$C_3H_7$, n-$C_4H_9$ or n-$C_5H_{11}$.

Preference is given to media according to the invention which comprise at least one compound of the formulae IA1, IA5, IA9, IA17, IA40, IA41, IA42, IA47, IA52 and/or IA53, particularly preferably in each case at least one compound of the formula IA47, particular preference being given to the compounds in which R[11] is a straight-chain alkyl radical having from 1 to 7 carbon atoms.

Further preferred compounds of the formula I are compounds of the formulae I1 to I8:

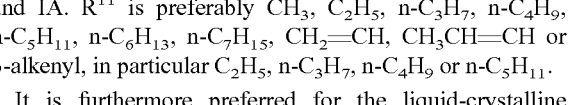
I1

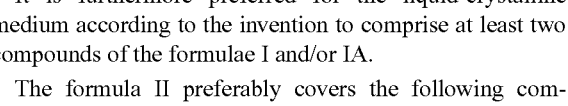
I2

I3

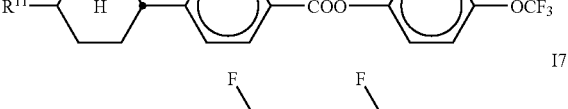
I4

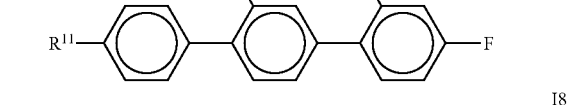
I5

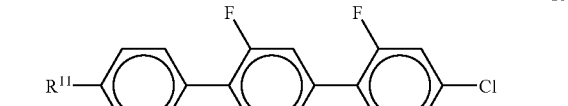
I6

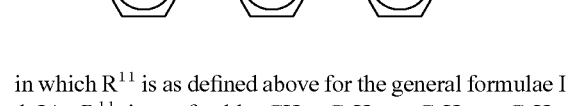
I7

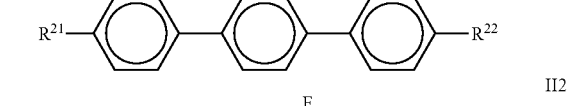
I8 in which R[11] is as defined above for the general formulae I and IA. R[11] is preferably $CH_3$, $C_2H_5$, n-$C_3H_7$, n-$C_4H_9$, n-$C_5H_{11}$, n-$C_6H_{13}$, n-$C_7H_{15}$, $CH_2$=CH, $CH_3CH$=CH or 3-alkenyl, in particular $C_2H_5$, n-$C_3H_7$, n-$C_4H_9$ or n-$C_5H_{11}$.

It is furthermore preferred for the liquid-crystalline medium according to the invention to comprise at least two compounds of the formulae I and/or IA.

The formula II preferably covers the following compounds:

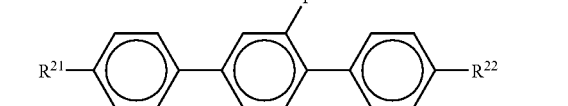
II1

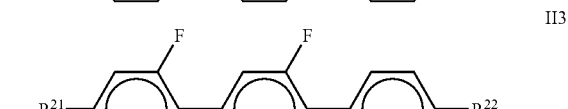
II2

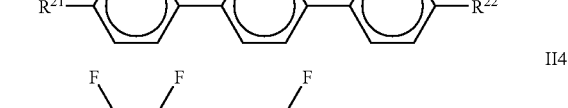
II3

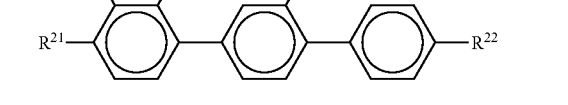
II4

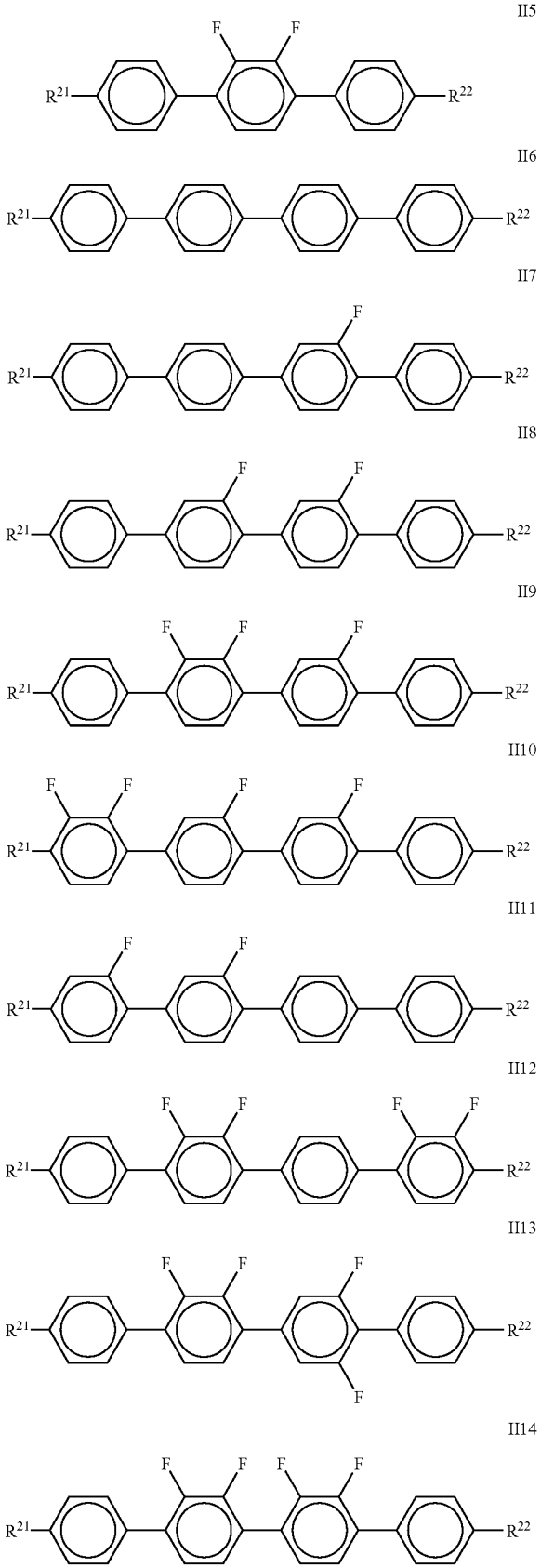

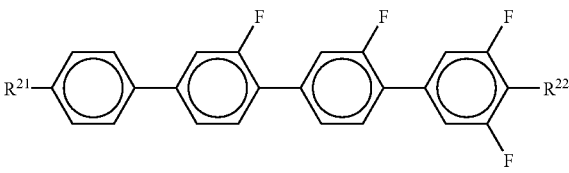

in which $R^{21}$ and $R^{22}$ are as defined above.

$R^{21}$ and $R^{22}$ in the compounds of the formulae II1 to II15 are preferably, independently of one another, F, Cl, $CF_3$ or straight-chain alkyl having from 1 to 7 carbon atoms. $R^{21}$ is, in particular, $CH_3$, $C_2H_5$, n-$C_3H_7$, n-$C_4H_9$, n-$C_5H_{11}$, n-$C_6H_{13}$ or n-$C_7H_{15}$, very particularly preferably $C_2H_5$, n-$C_3H_7$, n-$C_4H_9$ or n-$C_5H_{11}$, while $R^{22}$ is, in particular, F, Cl, $CF_3$, $CH_3$, $C_2H_5$, n-$C_3H_7$, n-$C_4H_9$, n-$C_5H_{11}$, n-$C_6H_{13}$ or n-$C_7H_{15}$, very particularly preferably F, $C_2H_5$, n-$C_3H_7$, n-$C_4H_9$ or n-$C_5H_{11}$. Of these preferred compounds, the compounds of the formulae II2, II3, II9 and II10 where $R^{21}$ and $R^{22}$, independently of one another, are $C_{1-7}$-alkyl and of the formula II15 where $R^{21}$ is $C_{1-7}$-alkyl and $R^{22}$ is F or $C_{1-7}$-alkyl are particularly preferred.

It is furthermore preferred for the medium according to the invention additionally to comprise at least one compound of the formula III:

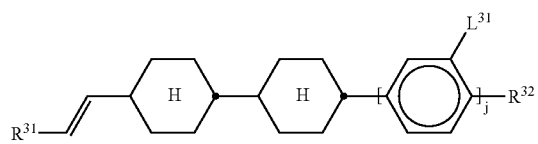

in which
$L^{31}$ is H or F;
$R^{31}$ is H, a halogenated or unsubstituted alkyl radical having from 1 to 15 carbon atoms, where one or more $CH_2$ groups in these radicals may also be replaced by —C≡C—, —CH=CH—, —O—, —CO—O— or —O—CO— in such a way that O atoms are not linked directly to one another;
$R^{32}$ is H, F, Cl, a halogenated or unsubstituted alkyl radical having from 1 to 15 carbon atoms, where one or more $CH_2$ groups in these radicals may also be replaced by —C≡C—, —CH=CH—, —O—, —CO—O— or —O—CO— in such a way that O atoms are not linked directly to one another; and
j is 0 or 1.

If $R^{31}$ and/or $R^{32}$ is an alkyl or alkoxy radical, this may be straight-chain or branched. It is preferably straight-chain, has 1, 2, 3, 4, 5, 6 or 7 carbon atoms and accordingly is preferably methyl, ethyl, propyl, butyl, pentyl, hexyl, heptyl, methoxy, ethoxy, propoxy, butoxy, pentoxy, hexyloxy or heptyloxy, furthermore octyl, nonyl, decyl, undecyl, dodecyl, tridecyl, tetradecyl, pentadecyl, octyloxy, nonyloxy, decyloxy, undecyloxy, dodecyloxy, tridecyloxy or tetradecyloxy.

Oxaalkyl is preferably straight-chain 2-oxapropyl (=methoxymethyl), ethoxymethyl or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, -4-, 5-, 6-, 7- or 8-oxanonyl, or 2-, 3-, 4-, 5-, 6-, 7-, 8 8- or 9-oxadecyl.

If $R^{31}$ and/or $R^{32}$ is an alkyl radical in which one $CH_2$ group has been replaced by —CH=CH—, this may be straight-chain or branched. A radical of this type is also known as an alkenyl radical. It is preferably straight-chain and has from 2 to 10 carbon atoms. Accordingly, it is particularly preferably vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, 4-, -5- or -6-enyl, oct-1-, -2-, -3-, 4-, -5-, -6- or -7-enyl, non-1-, -2-, -3-, -4-, -5-, -6-, -7- or -8-enyl, or dec-1-, -2-, -3-, 4-, -5-, -6-, -7-, -8- or -9-enyl. If the alkenyl group can have the E or Z configuration, the E configuration (trans configuration) is generally preferred.

If $R^{31}$ and/or $R^{32}$ is an alkyl radical in which one $CH_2$ group has been replaced by —O— and one has been replaced by —CO—, these are preferably adjacent. These thus contain an acyloxy group —CO—O— or an oxycarbonyl group —O—CO. These are preferably straight-chain and have from 2 to 6 carbon atoms. Accordingly, they are in particular acetoxy, propionyloxy, butyryloxy, pentanoyloxy, hexanoyloxy, acetoxymethyl, propionyloxy methyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If $R^{31}$ and/or $R^{32}$ is an alkyl radical in which one $CH_2$ group has been replaced by unsubstituted or substituted —CH=CH— and an adjacent $CH_2$ group has been replaced by CO, CO—O or O—CO, this may be straight-chain or branched. It is preferably straight-chain and has from 4 to 12 carbon atoms. Accordingly, it is in particular acryloyloxymethyl, 2-acryloyloxyethyl, 3-acryloyloxypropyl, 4acryloyloxybutyl, 5acryloyloxypentyl, 6-acryloyloxyhexyl, 7-acryloyloxyheptyl, 8-acryloyloxyoctyl, 9-acryloyloxynonyl, 10-acryloyloxydecyl, methacryoyloxymethyl, 2-methacryloyloxyethyl, 3-methacryloyloxypropyl, 4-methacryloyloxybutyl, 5methacryloyloxypentyl, 6-methacryloyloxyhexyl, 7-methacryloyloxyheptyl, 8-methacryloyloxyoctyl or 9-methacryloyloxynonyl.

If $R^{31}$ and/or $R^{32}$ is an alkyl, alkoxy or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position. Particular preference is given to —$CF_3$, —$CHF_2$, —$CH_2F$, —$CH_2CF_3$, —$CHFCHF_2$, —$CF_2CF_3$, —$OCF_3$, —$OCHF_2$, —$OCH_2F$ and —CF=$CF_2$.

Compounds containing branched wing groups $R^{31}$ and/or $R^{32}$ may occasionally be of importance owing to better solubility in the usual liquid-crystalline base materials, but in particular as chiral dopants if they are optically active. Smectic compounds of this type are suitable as components of ferroelectric materials.

Branched groups of this type preferably contain not more than one chain branch. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If $R^{31}$ and/or $R^{32}$ is an alkyl radical in which two or more $CH_2$ groups have been replaced by —O— and/or —CO—O—, this may be straight-chain or branched. It is preferably branched and has from 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)pentyl.

$R^{31}$ is preferably H or methyl, ethyl, n-propyl or n-butyl, in particular H. $R^{32}$ is preferably F, Cl or straight-chain alkyl having 1, 2, 3, 4, 5, 6 or 7 carbon atoms, in particular F or n-propyl or n-pentyl.

Particularly preferred compounds of the formula III are

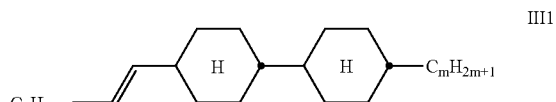

III1

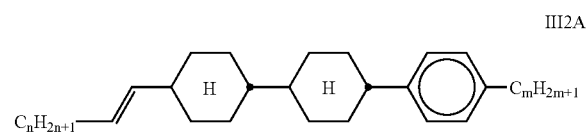

III2A

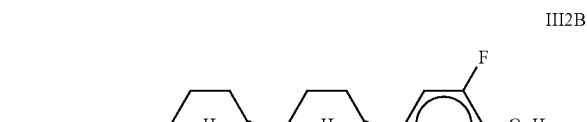

III2B

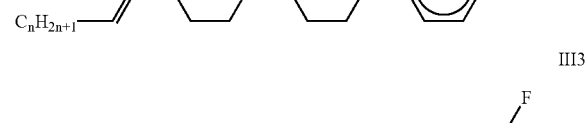

III3 where n and m, independently of one another, are 0, 1, 2, 3, 4, 5, 6 or 7. Very particular preference is given to the compounds of the formulae III1a and III1b where m=3, 4 or 5, compounds of the formula III2Aa where m=2, 3, 4 or 5, and the compound of the formula III3a:

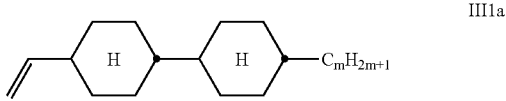

III1a

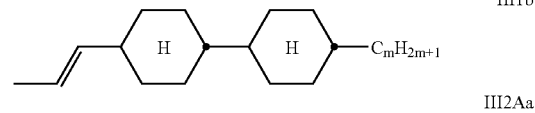

III1b

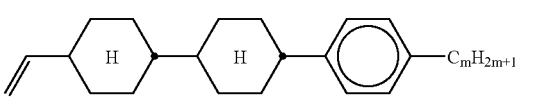

III2Aa

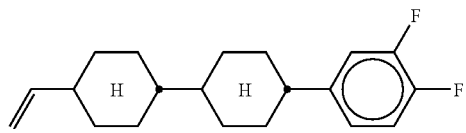

It is furthermore preferred for the liquid-crystalline media according to the invention to comprise one or more compounds of the formulae IV and/or V:

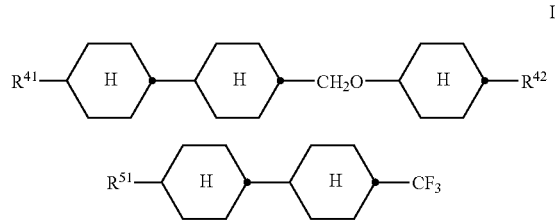

in which $R^{41}$, $R^{42}$ and $R^{51}$, independently of one another, are alkyl having from 1 to 12 carbon atoms.

$R^{41}$, $R^{42}$ and $R^{51}$ are preferably, independently of one another, linear alkyl chains each having from 1 to 7 carbon atoms, i.e. methyl, ethyl, n-propyl, n-butyl, n-pentyl, n-hexyl or n-heptyl, particularly preferably n-propyl, n-butyl or n-pentyl.

In addition, it is preferred for the liquid-crystalline media according to the invention to comprise at least one compound of the formulae VI and/or VII and/or VIII:

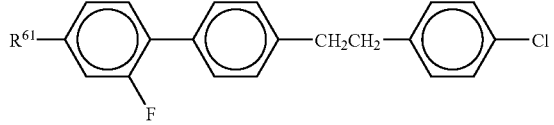

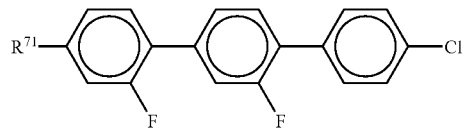

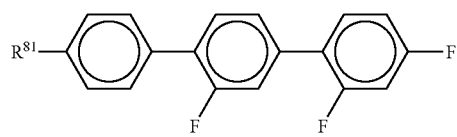

in which $R^{61}$, $R^{71}$ and $R^{81}$, independently of one another, are alkyl having from 1 to 12 carbon atoms.

$R^{61}$, $R^{71}$ and $R^{81}$ are preferably, independently of one another, unbranched alkyl each having from 1 to 7 carbon atoms, i.e. methyl, ethyl, n-propyl, n-butyl, n-pentyl, n-hexyl or n-heptyl, particularly preferably ethyl, n-propyl, n-butyl or n-pentyl.

The compounds of the formulae VI, VII and VIII also each form a preferred group of compounds of the formula I (where, inter alia, $Z^{11}$=single bond for the formulae VII and VIII or $Z^{11}$=—CH$_2$CH$_2$— for the formula VI). In certain embodiments of the invention, the compounds of the formula I are selected from the group formed by the compounds of the formulae VI, VII and VIII. In other, particularly preferred embodiments, the compounds of the formulae VI, VII and/or VIII are present in the liquid-crystalline medium according to the invention besides at least one compound of the formula I which is not also represented by one of the formulae VI, VII and VIII; this applies, in particular, if the compound(s) of the formula I is (are) one or more compounds of the formula IA.

The joint proportion of the compounds of the formulae I and II in the liquid-crystal mixture as a whole is preferably from 5 to 85% by weight, in particular from 10 to 75% by weight, particularly preferably from 15 to 65% by weight.

The proportion of the compounds of the formula II in the liquid-crystal mixture as a whole is preferably from 0.1 to 10% by weight, in particular from 0.25 to 5% by weight and particularly preferably from 0.5 to 2% by weight.

In preferred embodiments, the liquid-crystalline media according to the invention, besides the compounds of the formula I, in particular of the formula IA, and of the formula II and any further constituents, for example compounds of the formulae II, IV, V, VI, VII and/or VIII, furthermore comprise compounds of the formulae IX and/or X:

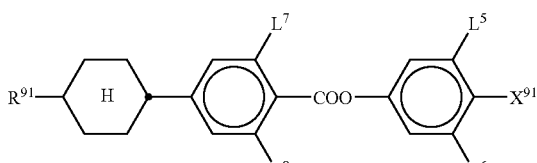

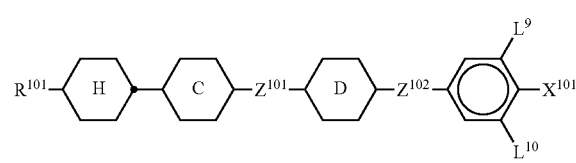

in which $R^{91}$ and $R^{101}$ are each, independently of one another, H, a halogenated or unsubstituted alkyl radical having from 1 to 15 carbon atoms, where, in addition, one or more CH$_2$ groups in these radicals may each be replaced, independently of one another, by —C≡C—, —CH=CH—, —O—, —CO—O— or —O—CO— in such a way that O atoms are not linked directly to one another;

$X^{91}$ and $X^{101}$ are each, independently of one another, F, Cl, CN, SF$_5$, SCN, NCS, a halogenated alkyl radical, a halogenated alkenyl radical, a halogenated alkoxy radical or a halogenated alkenyloxy radical, each having up to 6 carbon atoms;

$Z^{101}$ and $Z^{102}$ are each, independently of one another, —CF$_2$O—, —OCF$_2$— or a single bond, where $Z^{101}$≠$Z^{102}$;

$L^5$, $L^6$, $L^7$, $L^8$, $L^9$ and $L^{10}$ are each, independently of one another, H or F; and

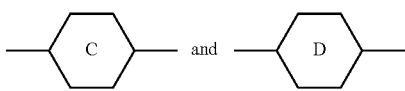

are each, independently of one another,

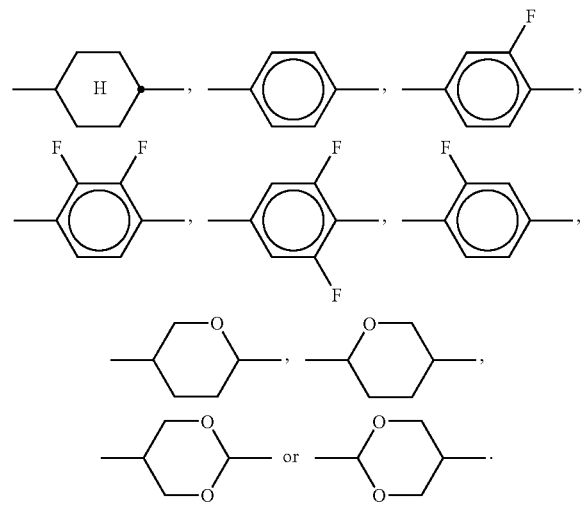

At the same time, the compounds of the formula IX form a preferred group of compounds of the formula I (where, inter alia, $Z^{11}$=—COO—). In certain preferred embodiments of the invention, the compounds of the formula I are selected from the group formed by the compounds of the formula IX. In other, particularly preferred embodiments, one or more compounds of the formula IX are present in the liquid-crystalline medium according to the invention besides at least one compound of the formula I which is not also represented by the formula IX; this applies, in particular, if the compound(s) of the formula I is (are) one or more compounds of the formula IA.

Preferred compounds of the formula IX are the following compounds:

IX1

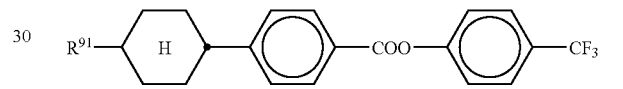

IX2

IX3

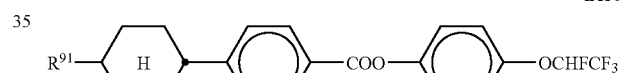

IX4

IX5

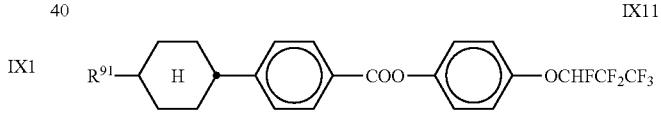

IX6

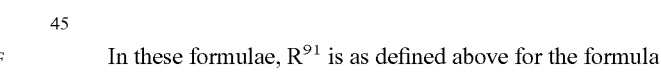

IX7

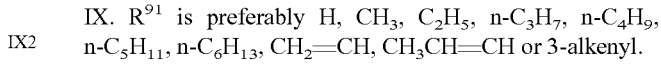

IX8

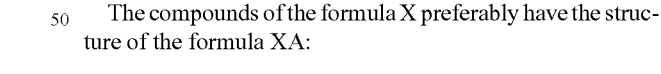

IX9

IX10

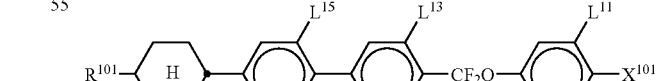

IX11

In these formulae, $R^{91}$ is as defined above for the formula IX. $R^{91}$ is preferably H, $CH_3$, $C_2H_5$, n-$C_3H_7$, n-$C_4H_9$, n-$C_5H_{11}$, n-$C_6H_{13}$, $CH_2$=CH, $CH_3CH$=CH or 3-alkenyl.

The compounds of the formula X preferably have the structure of the formula XA:

XA

In this formula, $R^{101}$ and $X^{101}$ are as defined above for the formula X, and $L^{11}$, $L^{12}$, $L^{13}$, $L^{14}$ and $L^{15}$, independently of one another, are H or F. Of these compounds of the formula XA, those of the following formulae XA1 to XA24 are particularly preferred:

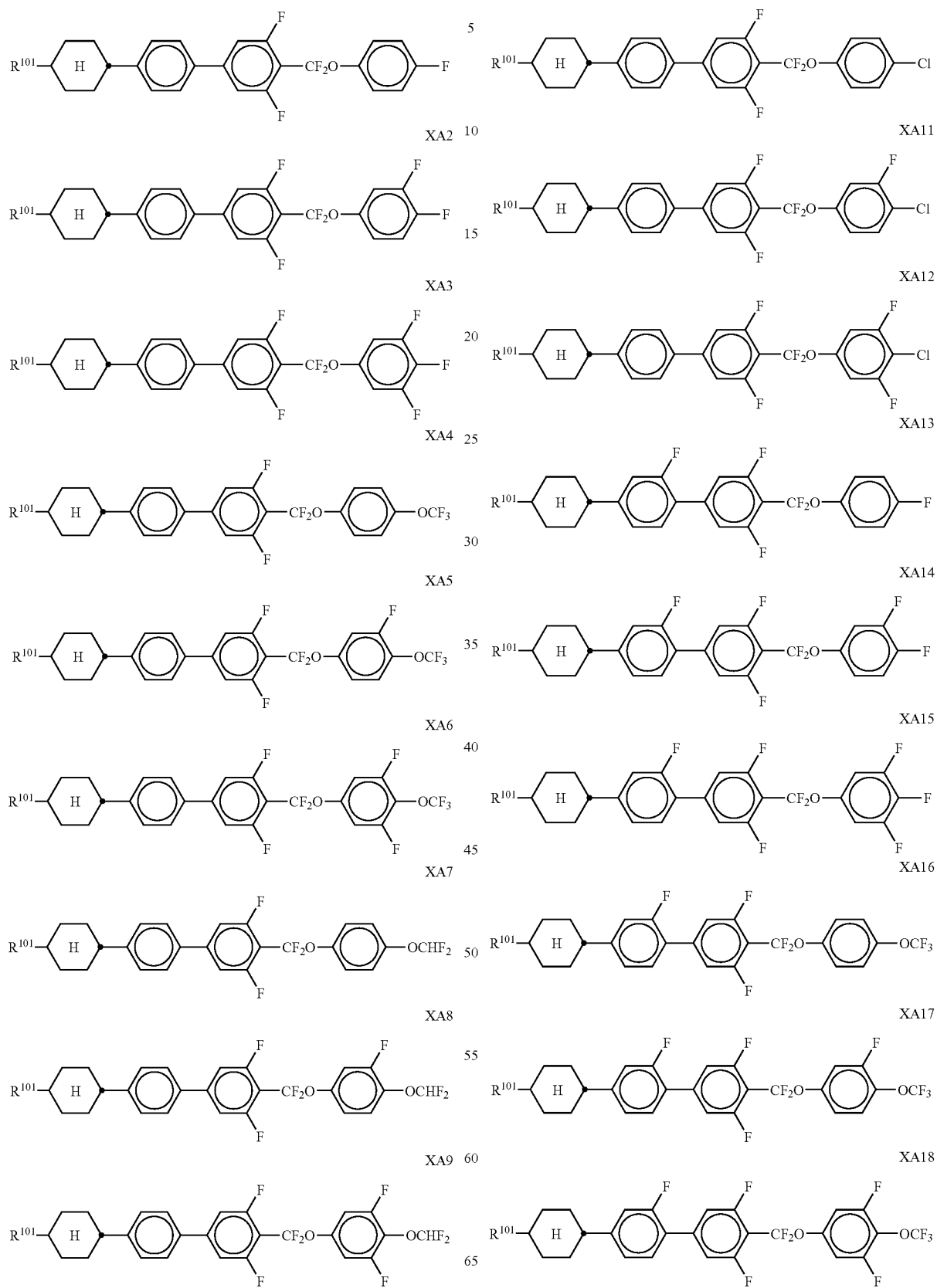

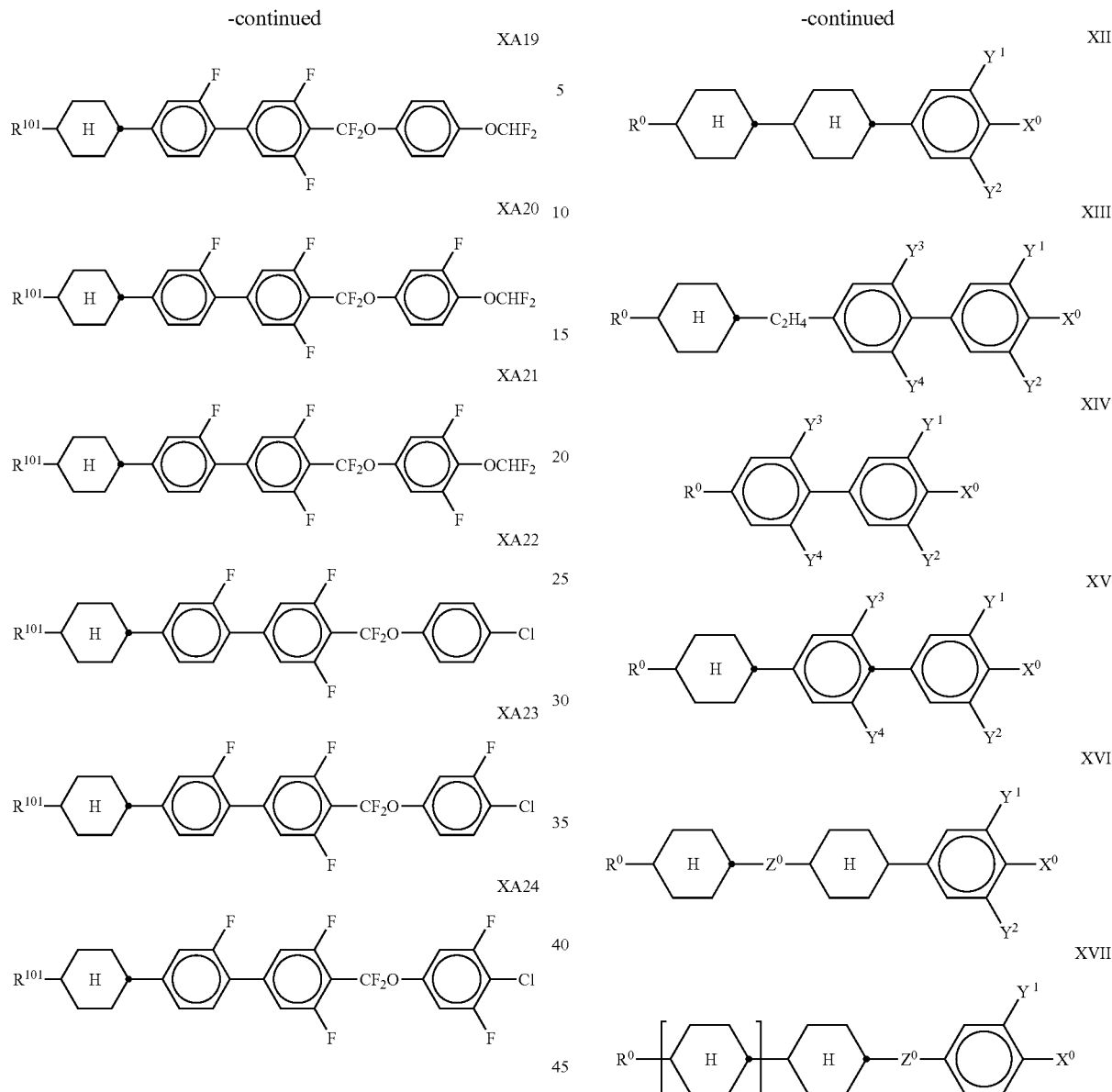

In these formulae, $R^{101}$ is as defined above for the formulae X and XA and is preferably straight-chain alkyl having from 1 to 7 carbon atoms, in particular $CH_3$, $C_2H_5$, n-$C_3H_7$, n-$C_4H_9$, n-$C_5H_{11}$, n-$C_6H_{13}$ or n-$C_7H_{15}$, furthermore 1E- or 3-alkenyl, in particular $CH_2$=CH, $CH_3CH$=CH, $CH_2$=CHCH$_2$CH$_2$ or $CH_3CH$=CH—CH$_2$CH$_2$.

It is furthermore preferred for the medium according to the invention additionally to comprise one or more compounds selected from the group consisting of compounds of the general formulae XI to XVII:

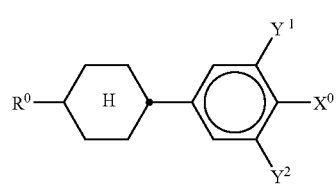

in which the individual radicals have the following meanings:

$R^0$ is H, n-alkyl, oxaalkyl, fluoroalkyl or alkenyl, each having up to 9 carbon atoms;

$X^0$ is F, Cl, halogenated alkyl, alkenyl, alkenyloxy or alkoxy having up to 6 carbon atoms;

$Z^0$ is —$C_2F_4$—, —CF=CF—, —$C_2H_4$—, —(CH$_2$)$_4$—, —$CF_2O$—, —$OCF_2$—, —$OCH_2$— or —$CH_2O$—;

$Y^1, Y^2, Y^3$ and $Y^4$ are each, independently of one another, H or F; and r is 0 or 1.

(Some compounds of the formulae XI, XII, XIV, XV and XVII may—given a corresponding choice of $X^0$, $Z^0$, $Y^1$, $Y^2$, $Y^3$, $Y^4$ and r—in each case form a group of compounds of the formula I (and/or of the formula IA). In certain preferred embodiments of the invention, the compounds of the formula I (or, with regard to certain compounds of the formulae XII, XV and XVII, also of the formula IA) are selected from the groups formed by the compounds of the formulae XI, XII, XIV, XV and XVII; this applies, in particular, to compounds of the formulae XII, XV and XVII where $Y^1$=F, $Y^2$=H or F and, where present, $Z^0$=—$CF_2O$—. In other, particularly preferred embodiments, one or more compounds of the formulae XI, XII, XIV, XV and/or XVII are present in the liquid-crystalline media according to the invention besides at least one compound of the formula I or in particular of the formula IA which is not represented by the formulae XI, XII, XIV, XV and/or XVII.)

Preferred compounds of the formula XII are:

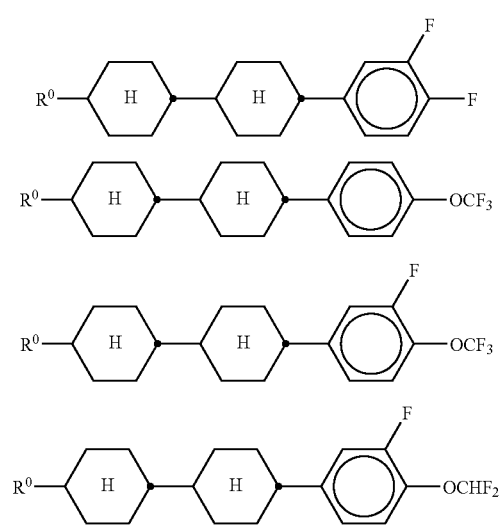

in which $R^0$ is as defined above.

Preferred compounds of the formula XV are:

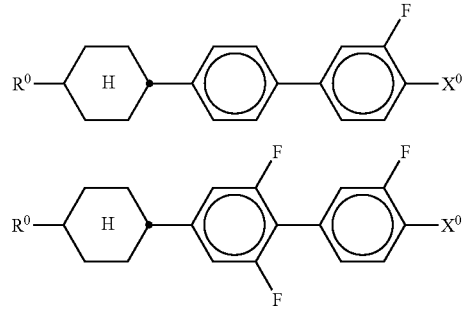

in which $R^0$ is as defined above.

The medium preferably additionally comprises one or more compounds selected from the group consisting of the general formulae XVIII to XXIV:

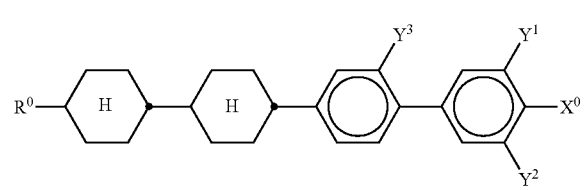

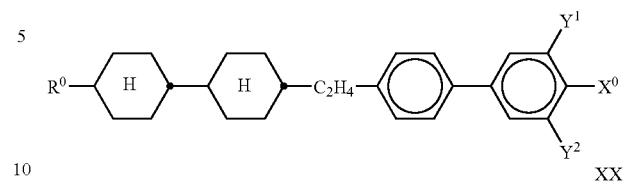

in which $R^0$, $X^0$, $Y^1$ and $Y^2$ are each, independently of one another, as defined above for one of the formulae XI to XVII. $Y^3$ is H or F. $X^0$ is preferably F, Cl, $CF_3$, $OCF_3$ or $OCHF_2$. $R^0$ is preferably alkyl, oxaalkyl, fluoroalkyl or alkenyl, each having up to 6 carbon atoms.

The medium preferably additionally comprises one or more ester compounds of the formulae Ea to Ec (if they are not already present as compound(s) of the formula I or IA)

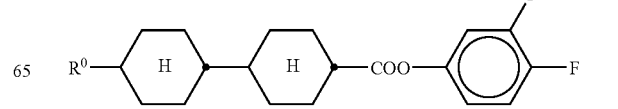

-continued

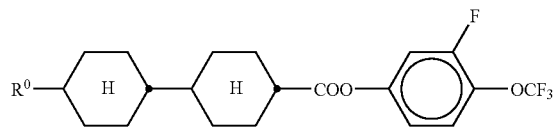
Eb

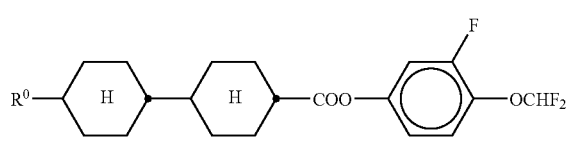
Ec in which R⁰ is as defined above for one of the formulae XI to XVII.

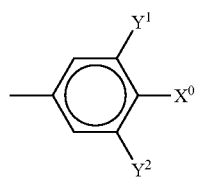

is preferably

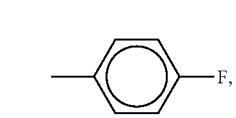  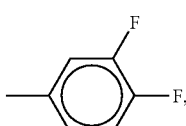

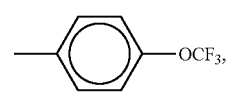  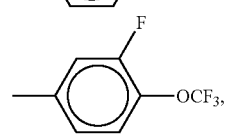

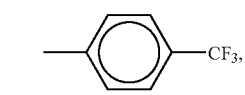  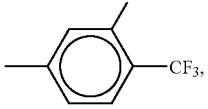

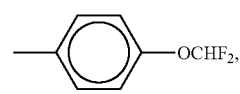  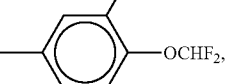

 or 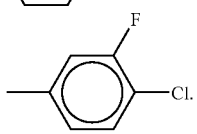

The medium additionally comprises one, two, three or more, preferably two or three, compounds of the formula O1

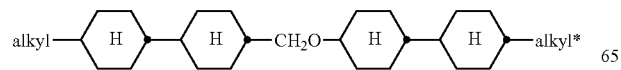
O1 in which "alkyl" and "alkyl*" are each, independently of one another, a straight-chain or branched alkyl radical having 1-9 carbon atoms.

The proportion of the compounds of the formula O1 in the mixtures according to the invention is preferably 5-10% by weight.

The medium preferably comprises one, two or three, furthermore four, homologues of the compounds selected from the group consisting of H1 to H12 (where n=1, 2, 3, 4, 5, 6, 7, 8, 9, 10, 11 or 12):

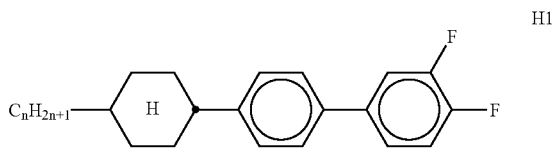
H1

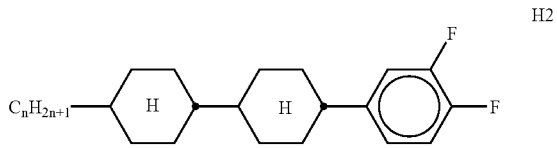
H2

H3
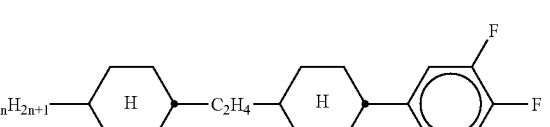

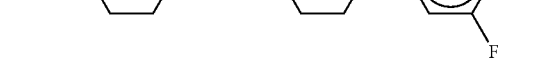
H4

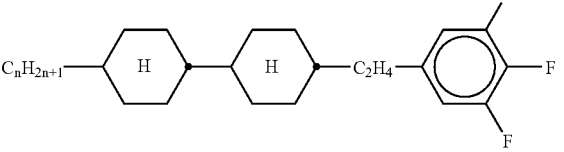
H5

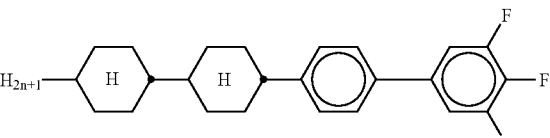
H6

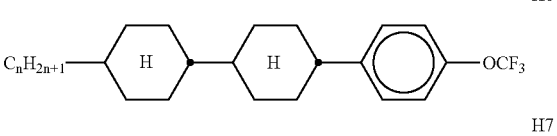
H7

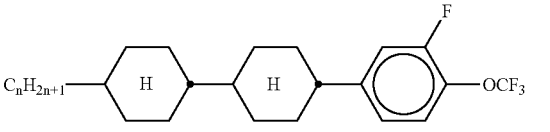
H8

-continued

H9

$C_nH_{2n+1}$—H—⌬(F,F,F)

H10

$C_nH_{2n+1}$—H—⌬—Cl

H11

$C_nH_{2n+1}$—H—H—COO—⌬—F

H12

$C_nH_{2n+1}$—H—CF$_2$O—⌬(F,F,F)

The medium comprises further compounds, preferably selected from the following group consisting of compounds of the formulae RI to RIX:

RI $R^0$—H—H—(O)alkyl

RII $R^0$—H—H—OCF$_3$

RIII alkenyl—H—H—⌬—F

RIV alkyl—H—H—CH=CF$_2$

RV alkyl—H—H—⌬—alkyl*

RVI $R^0$—H—⌬—(O)alkyl

RVII $R^0$—H—⌬($Y^3$)—COO—⌬($Y^1$)—OCF$_3$

RVIII alkyl—H—⌬($Y^5$)—⌬—H—alkyl*

RIX alkenyl—H—H—⌬—alkyl* in which $R^0$ is n-alkyl, oxaalkyl, fluoroalkyl, alkenyloxy or alkenyl, each having up to 9 carbon atoms;

$Y^1$, $Y^3$ and $Y^5$, independently of one another, are H or F;

"alkyl" and "alkyl*" are each, independently of one another, a straight-chain or branched alkyl radical having 1-9 carbon atoms;

"alkenyl" is a straight-chain or branched alkenyl radical having up to 9 carbon atoms.

The medium preferably comprises one or more compounds of the following formulae:

RIa $C_nH_{2n+1}$—H—H—$C_mH_{2m+1}$

RIb $C_nH_{2n+1}$—H—H—$OC_mH_{2m+1}$

RVIIa $C_nH_{2n+1}$—H—⌬(F)—COO—⌬—OCF$_3$

RVIIIa $C_nH_{2n+1}$—H—⌬—⌬—H—$C_mH_{2m+1}$

RVIIIb $C_nH_{2n+1}$—H—⌬(F)—⌬—H—$C_mH_{2m+1}$

RIXa $C_nH_{2n}$=—H—H—⌬—$C_mH_{2m+1}$ in which n and m, independently of one another, are 1, 2, 3, 4, 5, 6, 7, 8, 9, 10, 11 or 12. n and m are preferably, independently of one another, 1, 2, 3, 4, 5 or 6. In the case of the formula RIXa, n is in particular 2.

In a further embodiment, it is preferred for the medium according to the invention to comprise one or more compounds having fused rings, of the formulae AN1 to AN11:

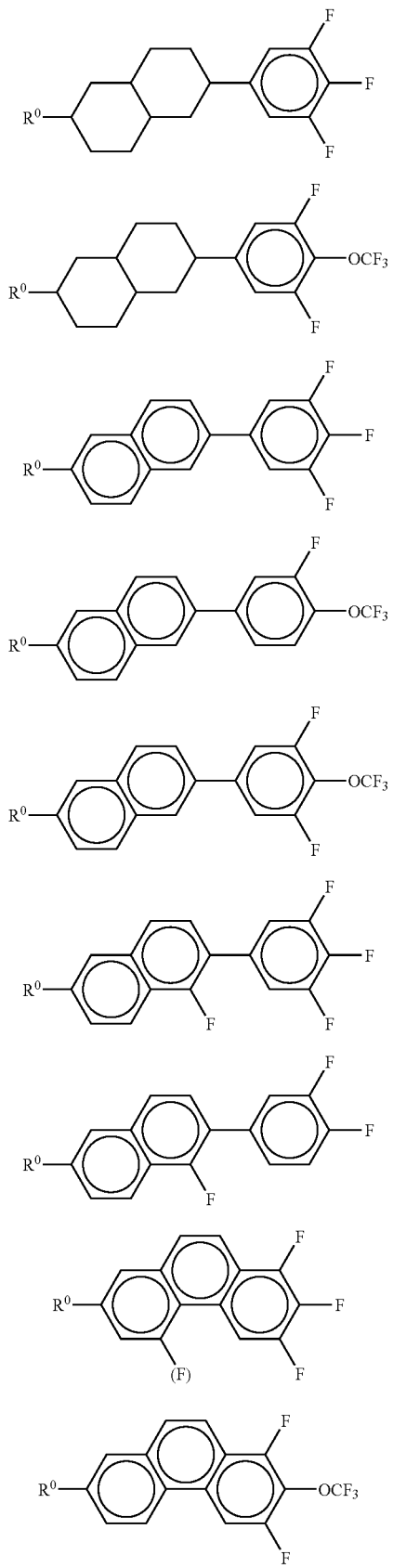

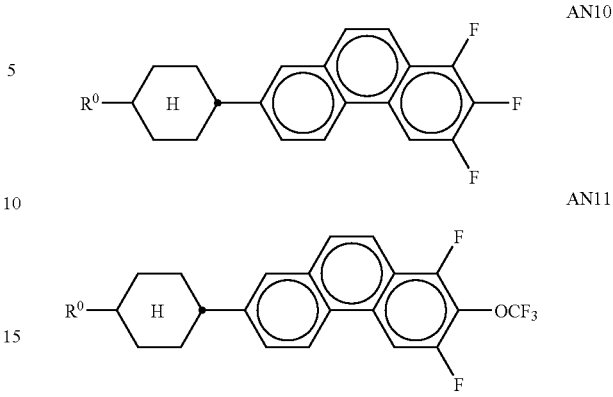

in which R⁰ is as defined above.

It has been found that the media according to the invention comprising compounds of the formulae I and II mixed with conventional liquid-crystal materials, but in particular with one or more compounds of the formulae III, IV, V, VI, VII and/or VIII and of the formulae IX, X, XI, XII, XIII, XIV, XV, XVI and/or XVII, results in very good stability, a significant lowering of the threshold voltage and in high values for the VHR values (100° C.), with broad nematic phases with low smectic-nematic transition temperatures being observed at the same time, improving the shelf life. The compounds of the formulae I to XVII are stable and readily miscible with one another and with other liquid-crystalline materials.

The term "alkyl" or "alkyl*"—unless defined otherwise elsewhere in this description or in the claims—covers straight-chain and branched alkyl groups having 1-12, preferably 1-7 carbon atoms, in particular the straight-chain groups methyl, ethyl, propyl, butyl, pentyl, hexyl and heptyl. Groups having 1-5 carbon atoms are generally preferred.

The term "alkenyl"—unless defined otherwise elsewhere in this description or in the claims—covers straight-chain and branched alkenyl groups having 2-12, preferably 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. Preferably, n=1 and m is from 1 to 6.

Through a suitable choice of the meanings of R⁰ and X⁰, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

A —CH$_2$CH$_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

A preferred aspect of the invention relates to liquid-crystalline media according to the invention which are present in a liquid-crystal mixture which is distinguished by a high value of the optical anisotropy $\Delta n$, preferably of >0.16, in particular of >0.20. So-called "high $\Delta n$" liquid-crystal mixtures of this type are used, in particular, in OCB (optical compensated birefringence), PDLC (polymer dispersed liquid crystal), TN and STN cells, in particular for achieving small layer thicknesses in TN and STN cells for shortening the response times. In these "high $\Delta n$" liquid-crystal mixtures, the liquid-crystalline medium according to the invention comprises compounds of the formula I which contribute to increasing the optical anisotropy $\Delta n$ besides at least one compound of the formula II. These compounds of the formula I are preferably one or more of the following compounds:

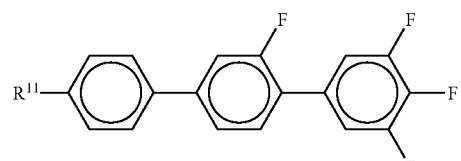
IA40

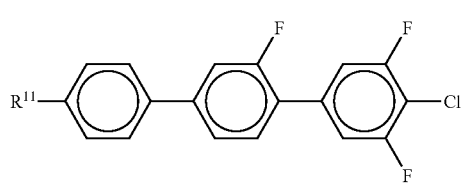
IA41

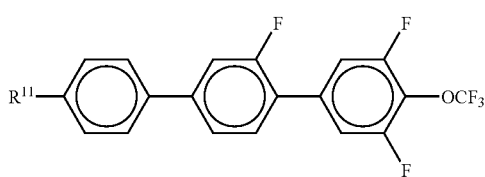
IA42

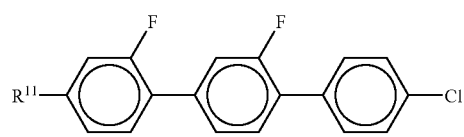
I2

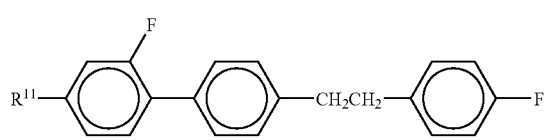
I3

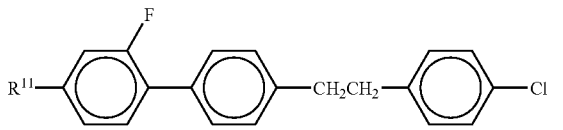
I4

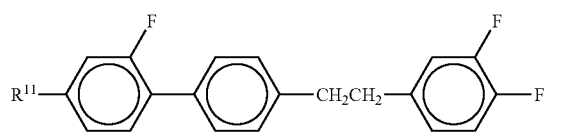
I5

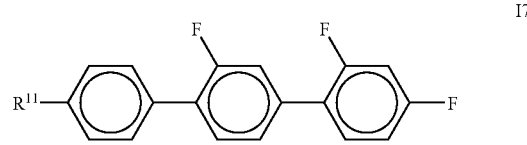
I7

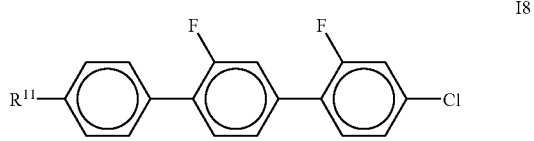
I8

$R^{11}$ here is as defined above for the formulae I and IA. These media according to the invention may furthermore comprise further compounds, in particular of the formulae III, IV, V, VI, VII, VIII, IX, X, XI, XII, XIII, XIV, XV, XVI and/or XVII, if the resultant mixture has a sufficiently high value of the optical anisotropy $\Delta n$ for the preferred use as "high $\Delta n$" mixture.

The optimum mixing ratio of the compounds of the formulae I and II+III+IV+V+VI+VII+VIII (optionally +IX+X+ XI+XII+XIII+XIV+XV+XVI+XVII) depends substantially on the desired properties, in particular on the desired use, on the choice of these components and the choice of any other components that may be present. Suitable mixing ratios can easily be determined from case to case.

The total amount of compounds of the formulae I to XVII in the mixtures according to the invention is not crucial. The mixtures may therefore comprise one or more further components for the purposes of optimisation of various properties.

The individual compounds of the above-mentioned formulae and subformulae which can be used in the media according to the invention are either known or can be prepared analogously to the known compounds.

The construction of the MLC display according to the invention from polarisers, electrode base plates and surface-treated electrodes corresponds to the conventional construction for displays of this type. The term conventional construction is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

Display devices can be filled with the liquid-crystal mixture comprising the liquid-crystalline medium according to the invention in a conventional manner, but in particular by the "one-drop filling method".

The liquid-crystal mixtures according to the invention are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0-15% of pleochroic dyes or chiral dopants can be added.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively; n and m are integers and are preferably 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$.

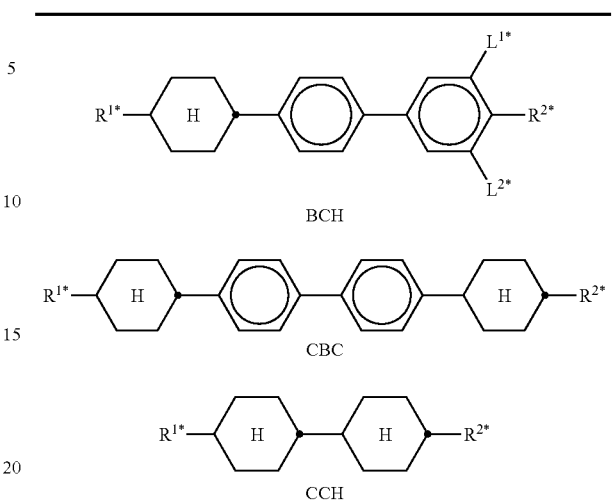

BCH

CBC

CCH

| Code for $R^{1*}$, $R^{2*}$, $L^{1*}$, $L^{2*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nO•m | $OC_nH_{2n+1}$ | $C_mH_{2m+1}$ | H | H |
| nOm | $C_nH_{2n+1}$ | $OC_mH_{2m+1}$ | H | H |
| n | $C_nH_{2n+1}$ | CN | H | H |
| nN•F | $C_nH_{2n+1}$ | CN | F | H |
| nN•F•F | $C_nH_{2n+1}$ | CN | F | F |
| nF | $C_nH_{2n+1}$ | F | H | H |
| nCL | $C_nH_{2n+1}$ | Cl | H | H |
| nF•F | $C_nH_{2n+1}$ | F | F | H |
| nF•F•F | $C_nH_{2n+1}$ | F | F | F |
| nmF | $C_nH_{2n+1}$ | $C_mH_{2m+1}$ | F | H |
| nCF$_3$ | $C_nH_{2n+1}$ | CF$_3$ | H | H |
| nOCF$_3$ | $C_nH_{2n+1}$ | OCF$_3$ | H | H |
| nOCF$_3$•F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are given in Tables A and B.

TABLE A

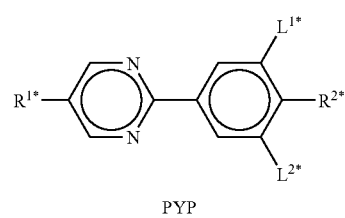

PYP

PYRP

TABLE A-continued

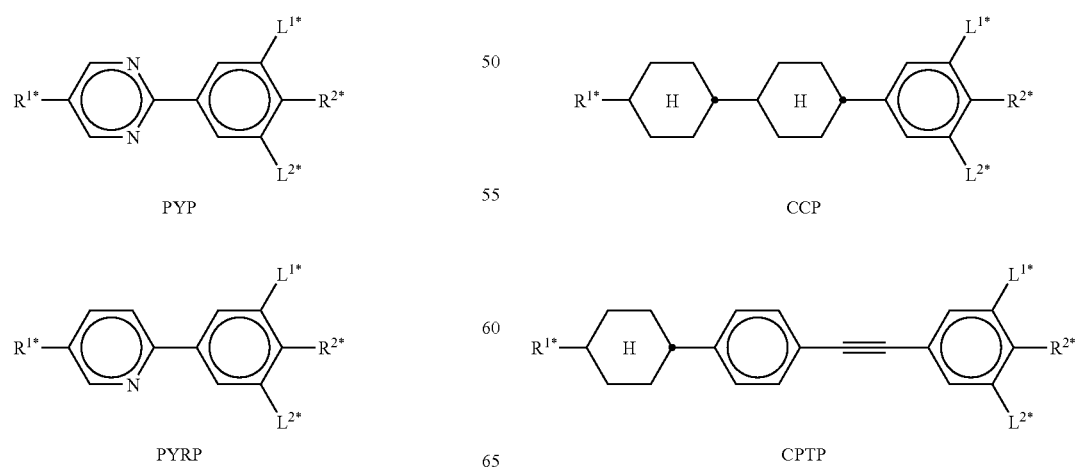

CCP

CPTP

TABLE A-continued
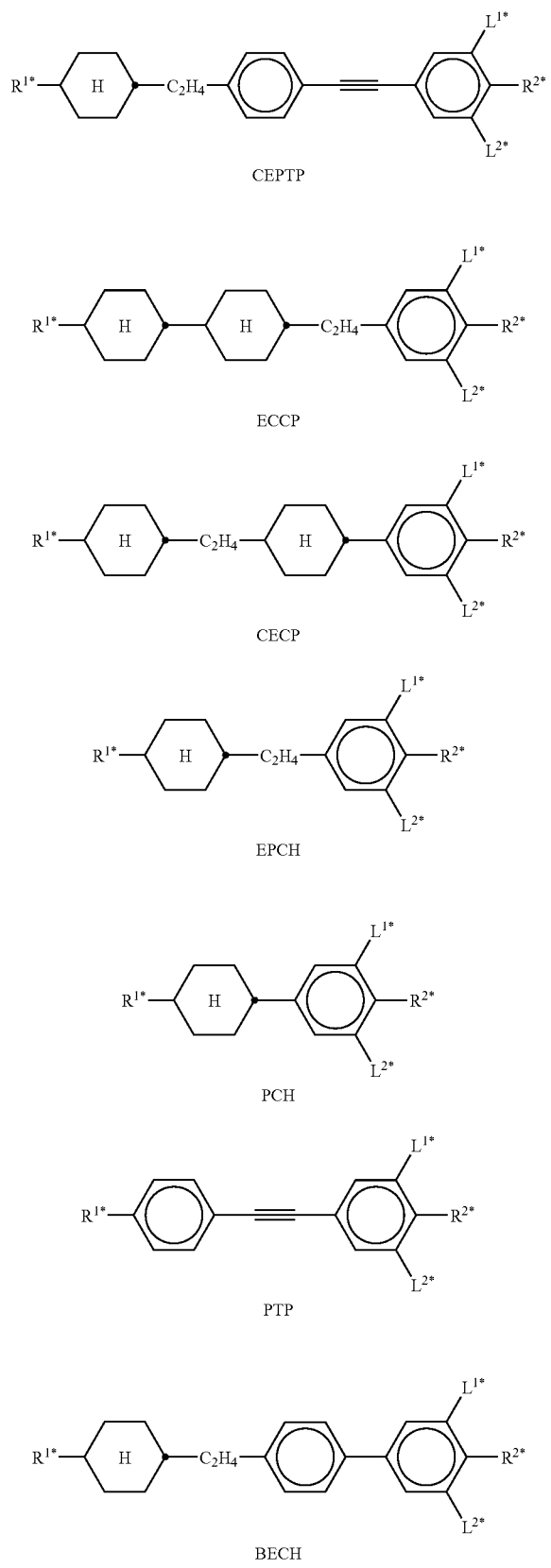
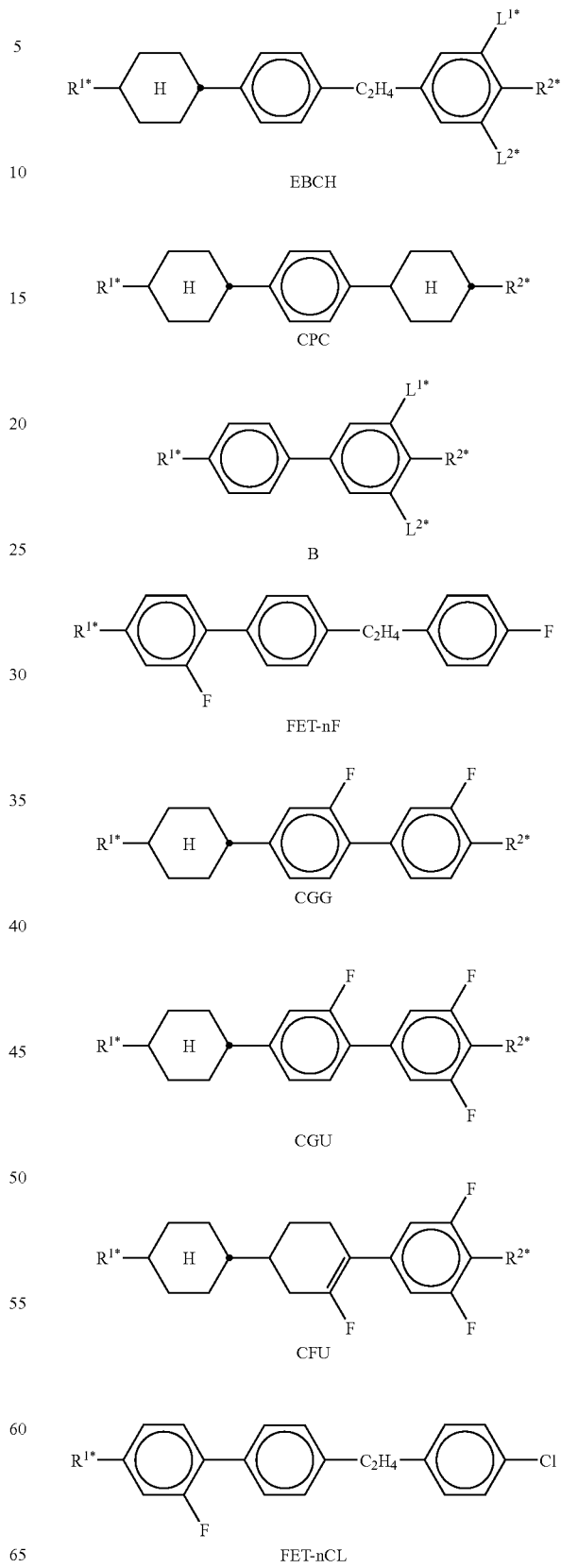

TABLE B
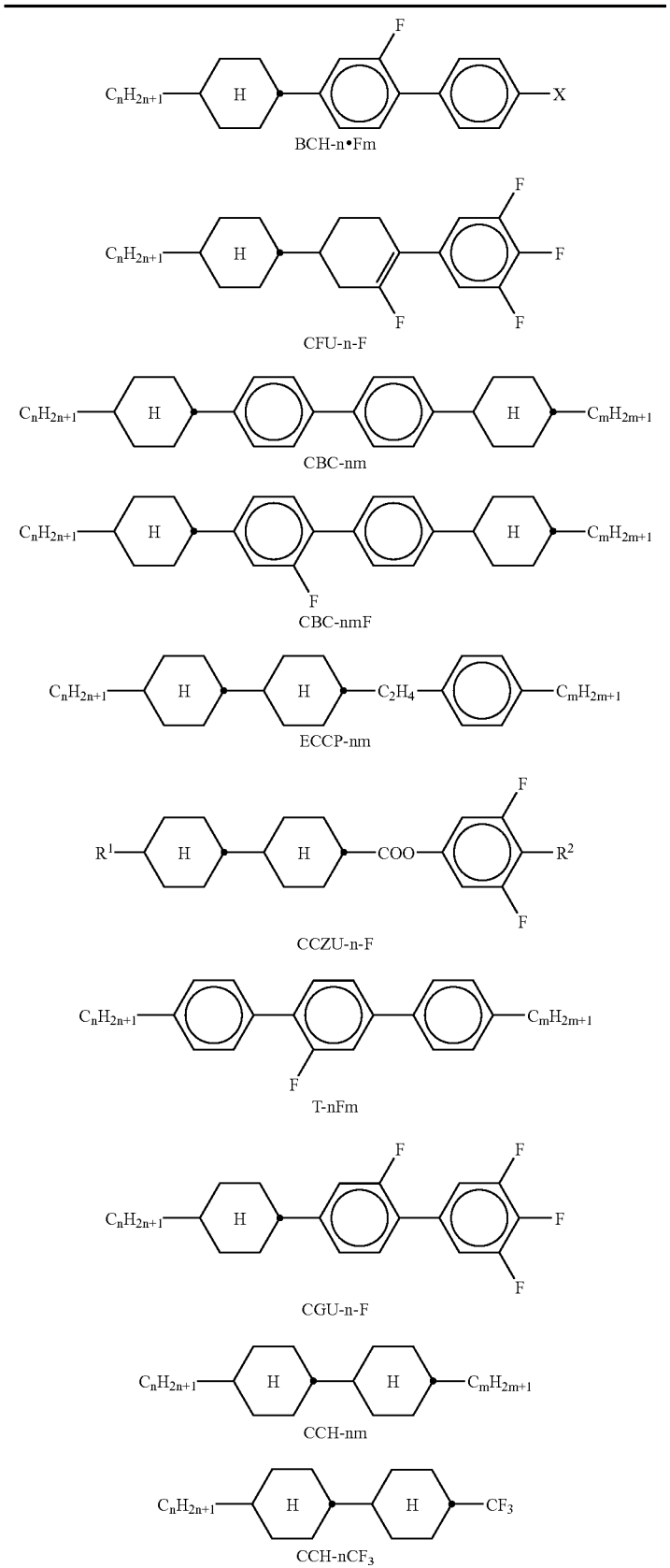

TABLE B-continued
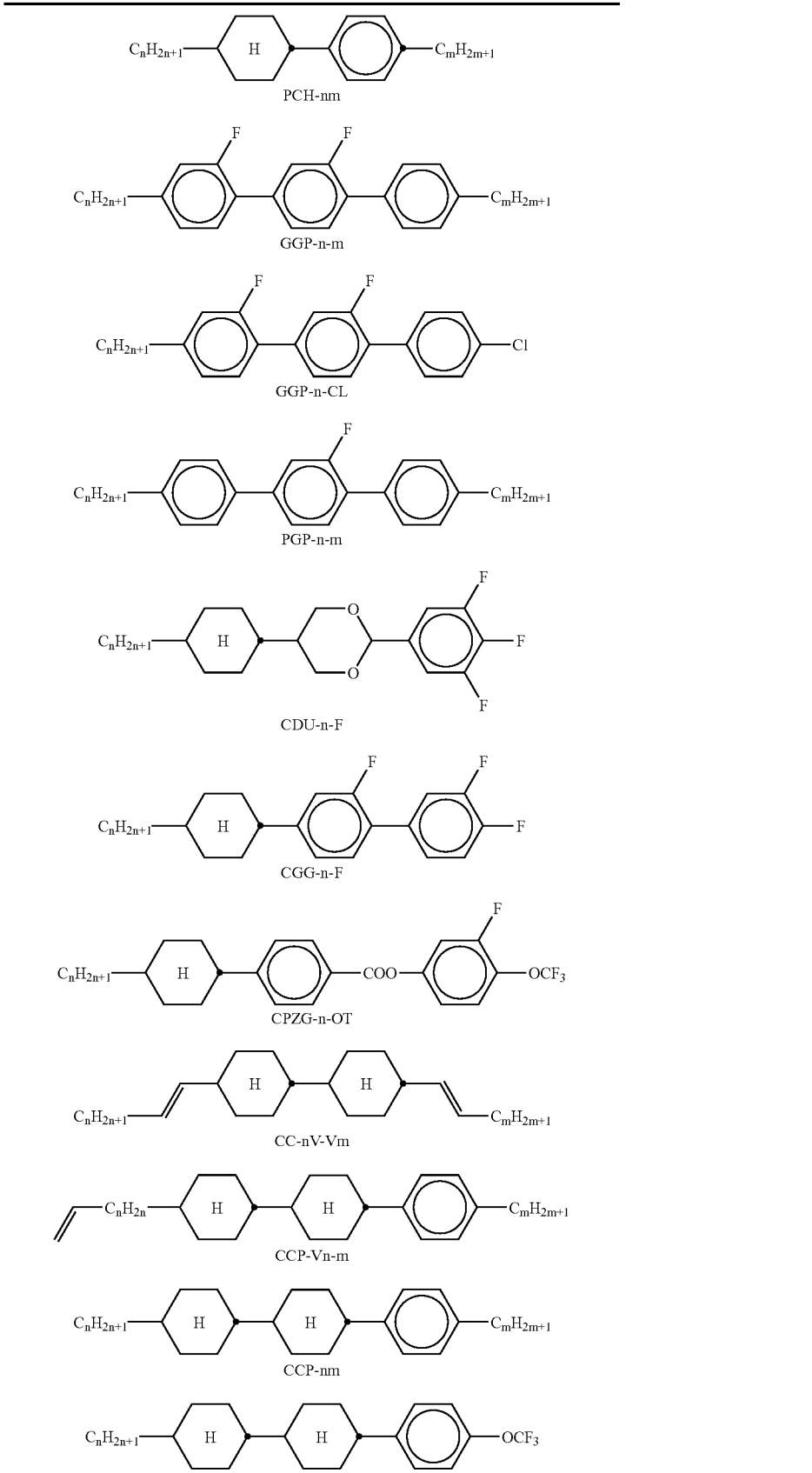

TABLE B-continued
CCP-nOCF₃
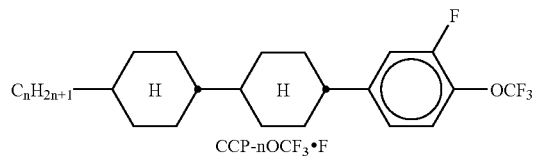
CCP-nOCF₃•F
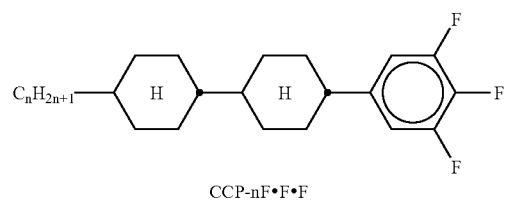
CCP-nF•F•F
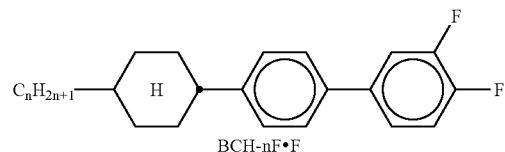
BCH-nF•F
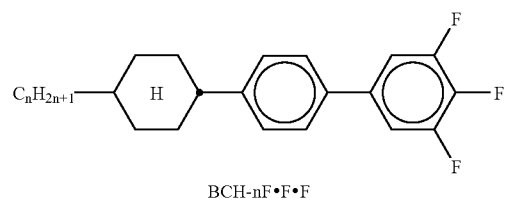
BCH-nF•F•F
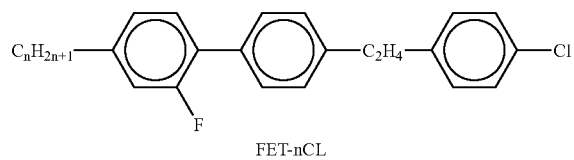
FET-nCL
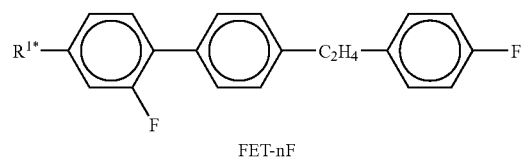
FET-nF
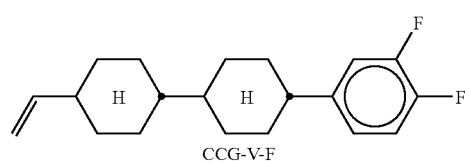
CCG-V-F
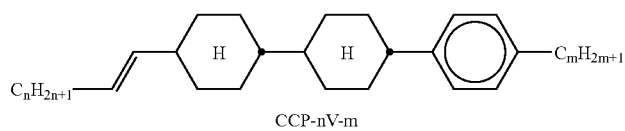
CCP-nV-m
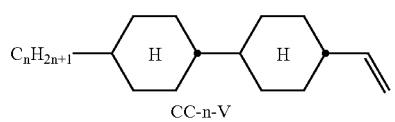
CC-n-V TABLE B-continued
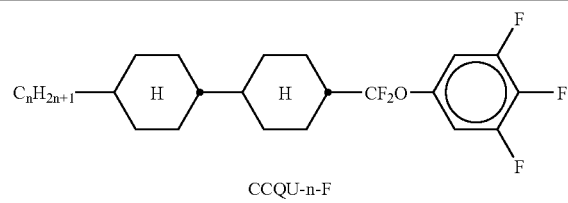
CCQU-n-F
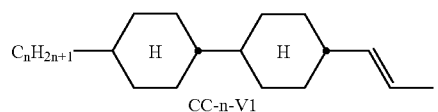
CC-n-V1
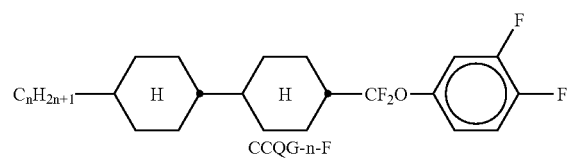
CCQG-n-F
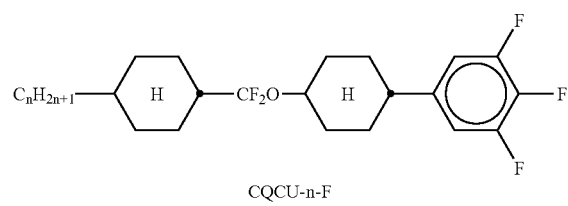
CQCU-n-F
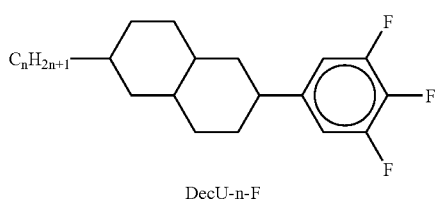
DecU-n-F
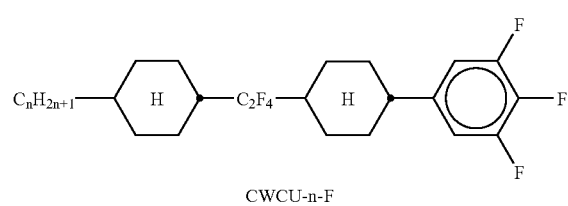
CWCU-n-F
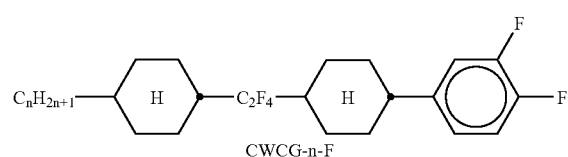
CWCG-n-F
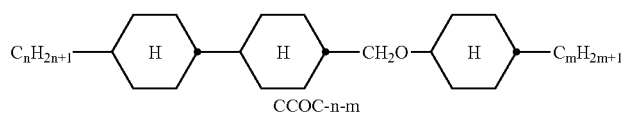
CCOC-n-m
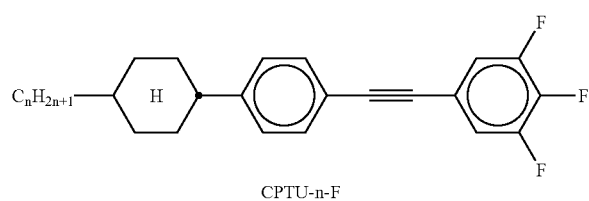
CPTU-n-F TABLE B-continued
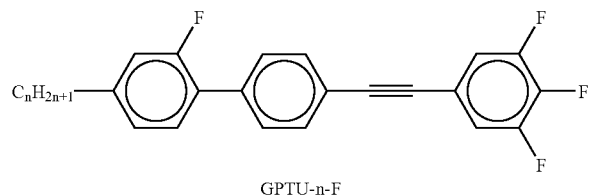
GPTU-n-F
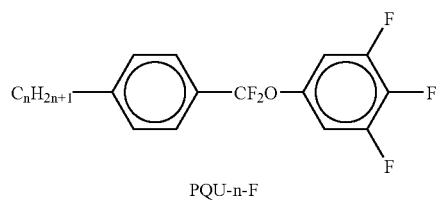
PQU-n-F
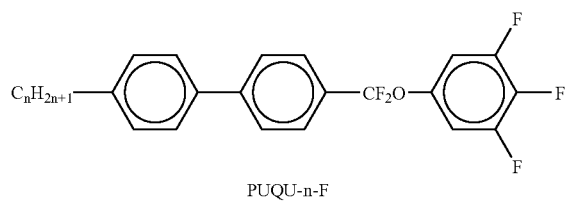
PUQU-n-F
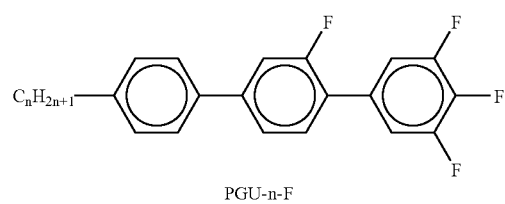
PGU-n-F
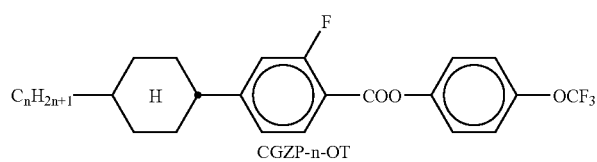
CGZP-n-OT
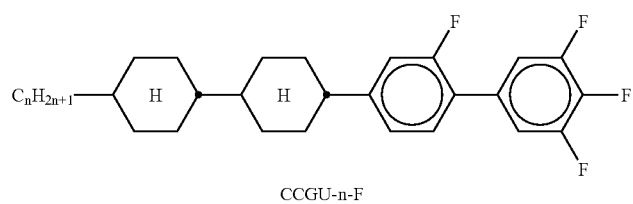
CCGU-n-F
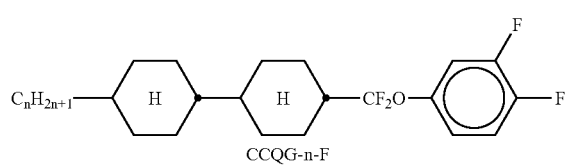
CCQG-n-F
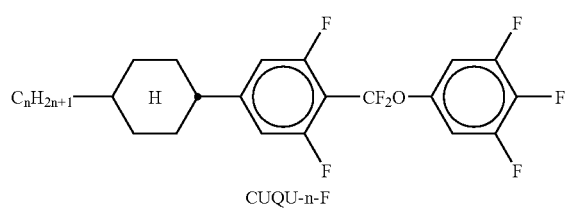
CUQU-n-F TABLE B-continued
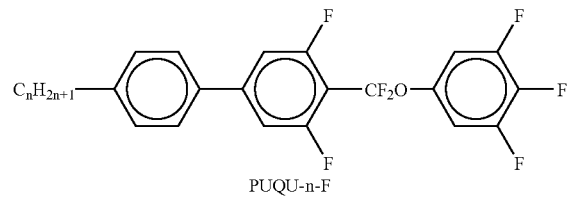
PUQU-n-F
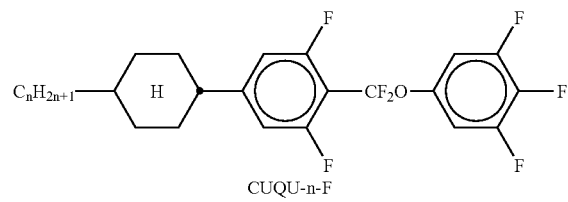
CUQU-n-F
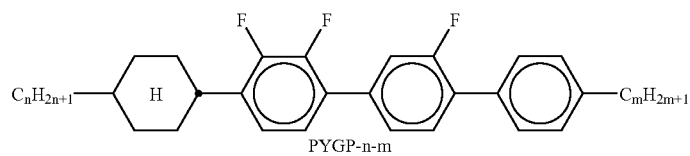
PYGP-n-m
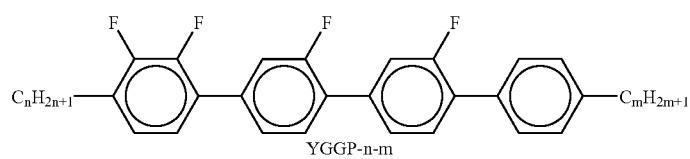
YGGP-n-m
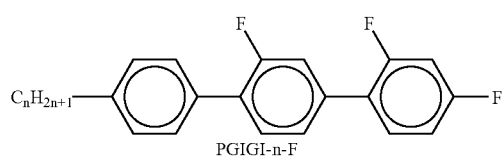
PGIGI-n-F
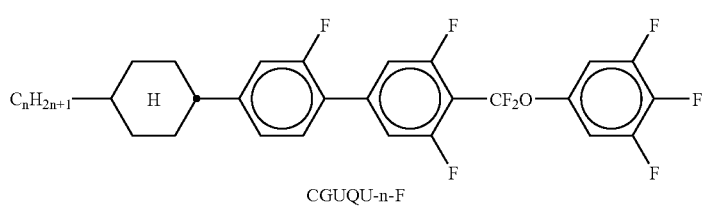
CGUQU-n-F
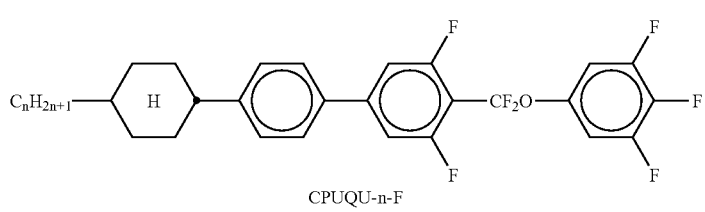
CPUQU-n-F
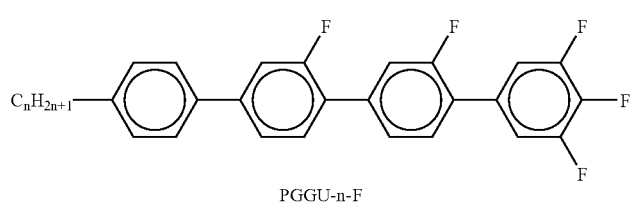
PGGU-n-F
Particular preference is given to liquid-crystalline mixtures which, besides the compounds of the formula I, comprise at least one, two, three or four compounds from Table B.

TABLE C
Table C shows possible dopants which are generally added to the mixtures according to the invention.
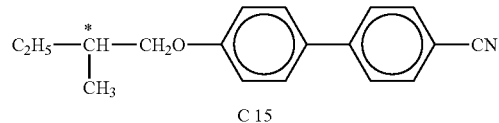
C 15
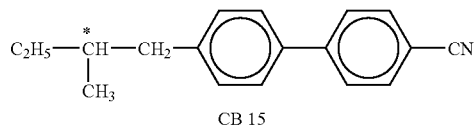
CB 15
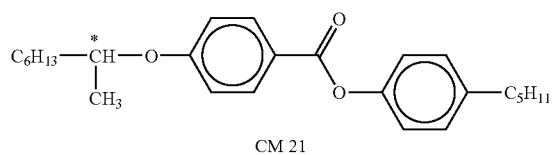
CM 21
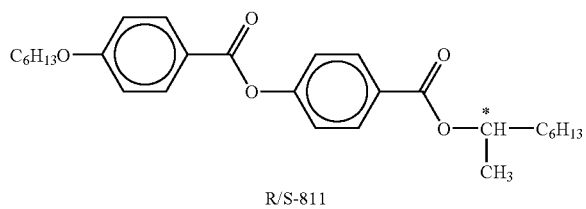
R/S-811
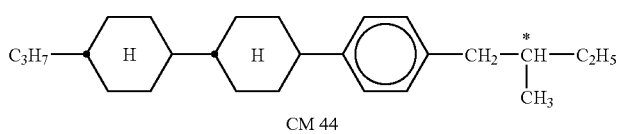
CM 44
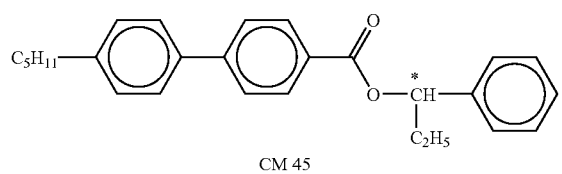
CM 45
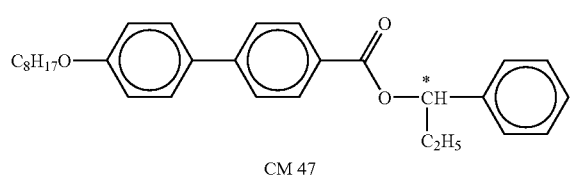
CM 47
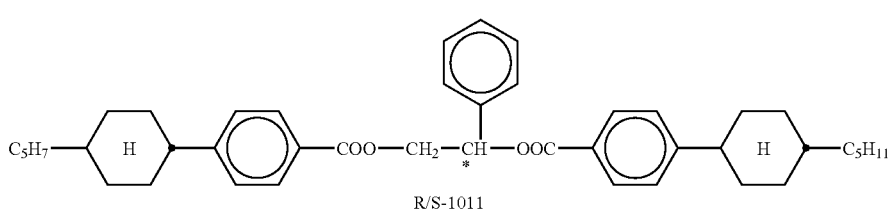
R/S-1011
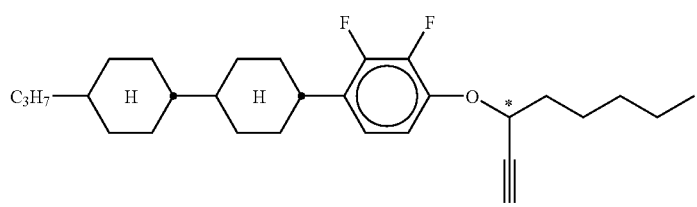

TABLE C-continued
Table C shows possible dopants which are generally added to the mixtures according to the invention.
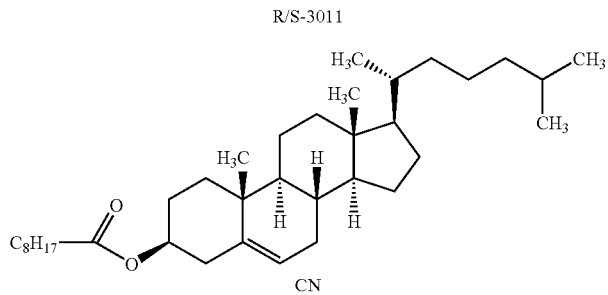
R/S-3011
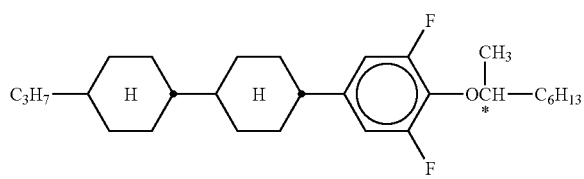
R/S-2011
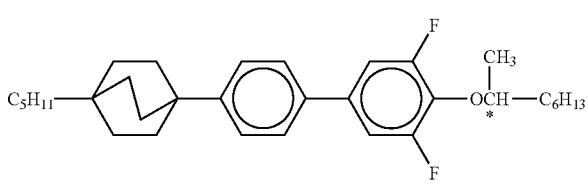
R/S-4011
TABLE D
Stabilisers which can be added, for example, to the mixtures according to the invention are mentioned below.
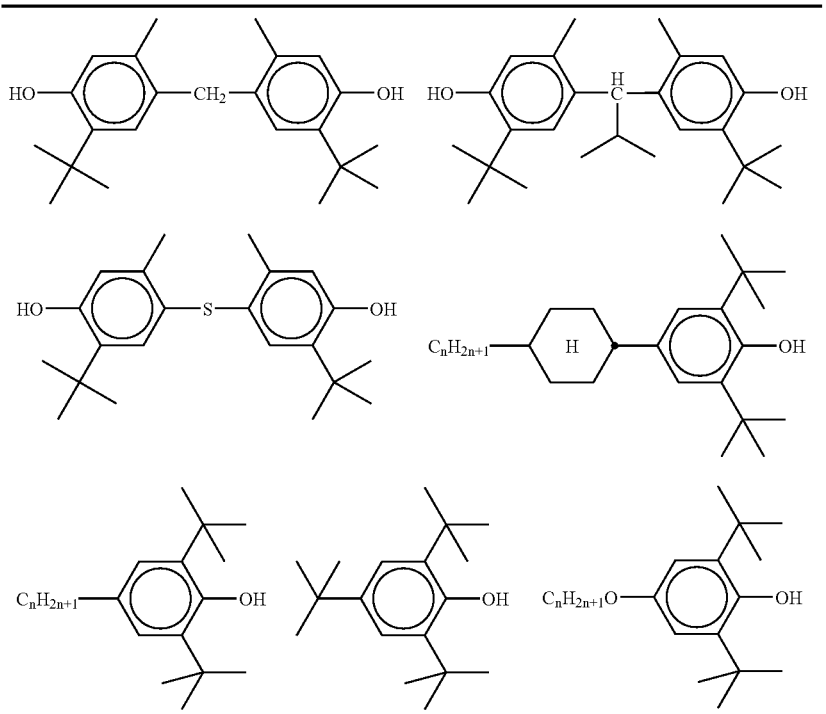

TABLE D-continued
Stabilisers which can be added, for example, to the mixtures according to the invention are mentioned below.
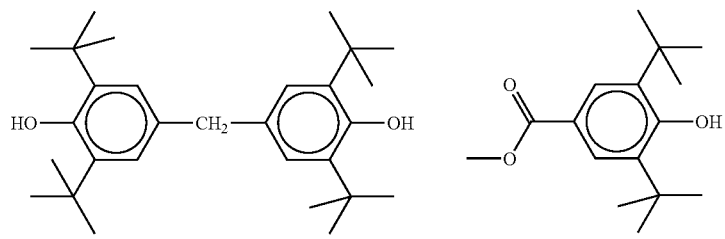
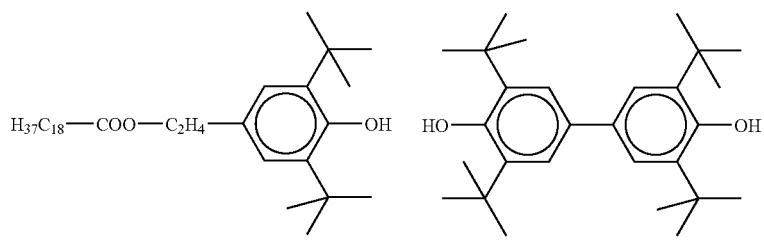
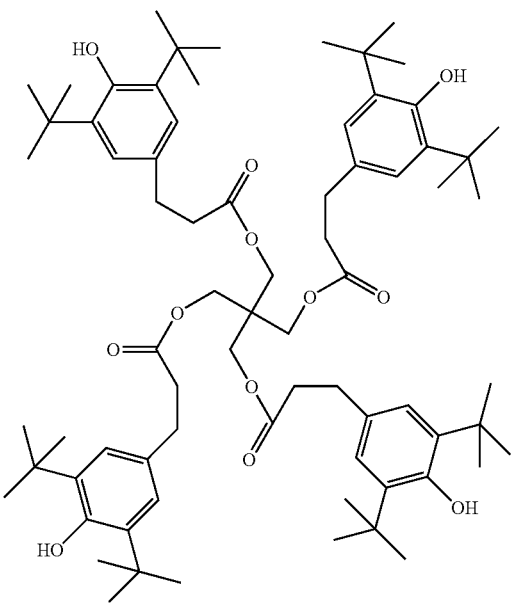
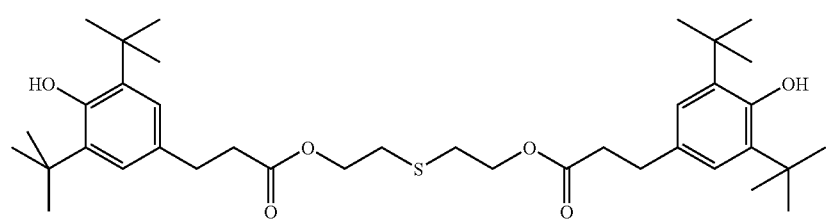

TABLE D-continued
Stabilisers which can be added, for example, to the mixtures according to the invention are mentioned below.
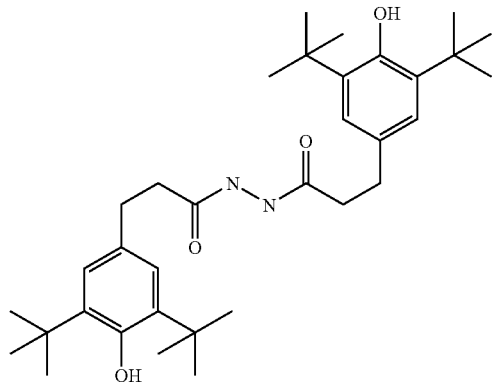
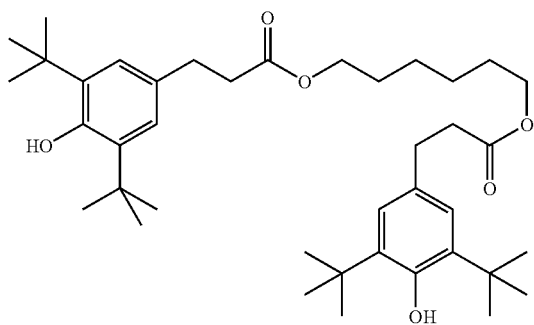
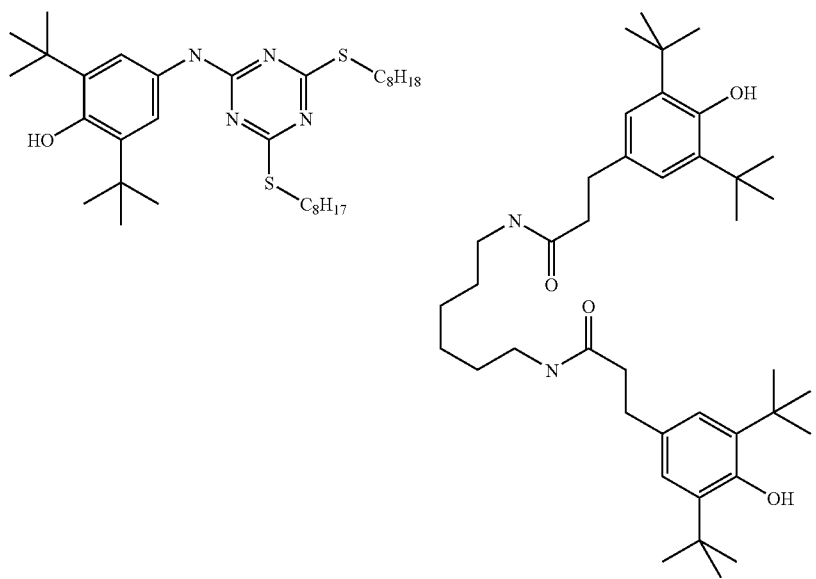

TABLE D-continued
Stabilisers which can be added, for example, to the mixtures according to the invention are mentioned below.
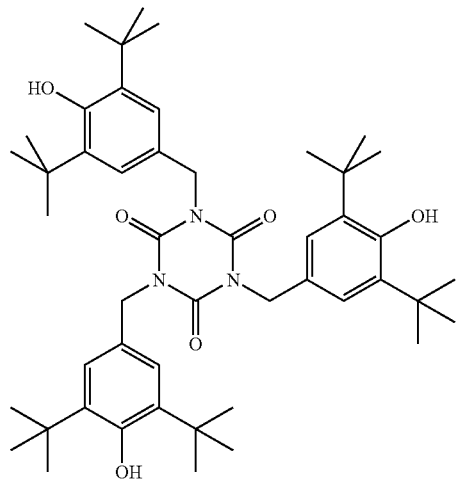
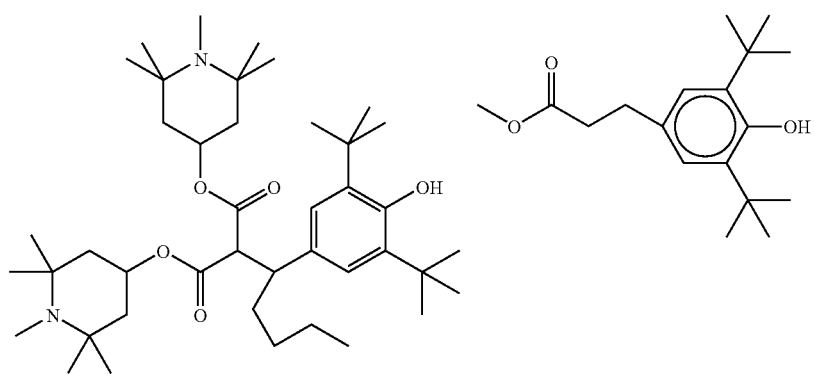
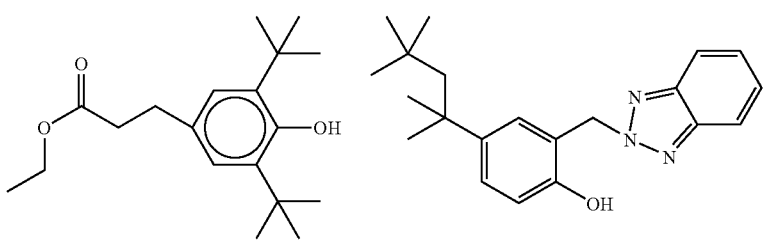
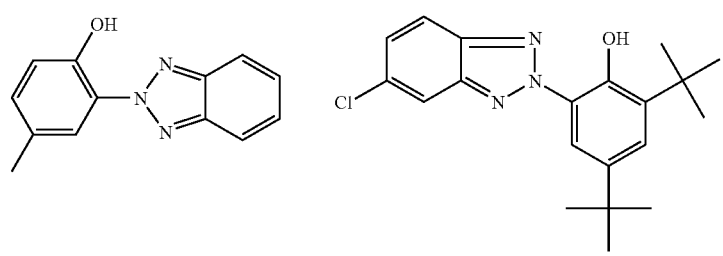

TABLE D-continued
Stabilisers which can be added, for example, to the mixtures according to the invention are mentioned below.
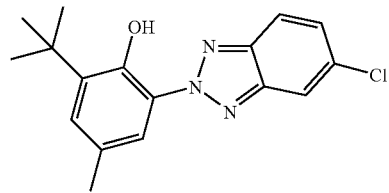
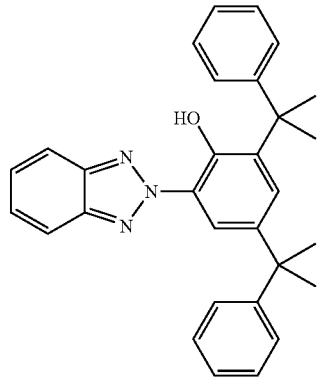
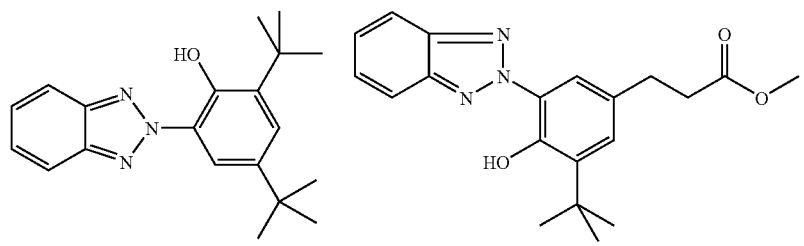
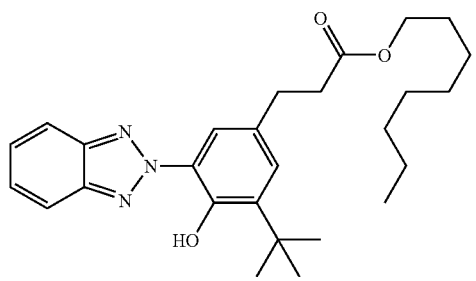
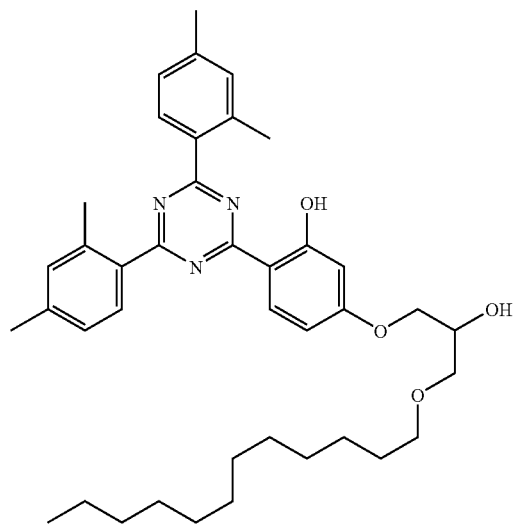

TABLE D-continued

Stabilisers which can be added, for example, to the mixtures according to the invention are mentioned below.

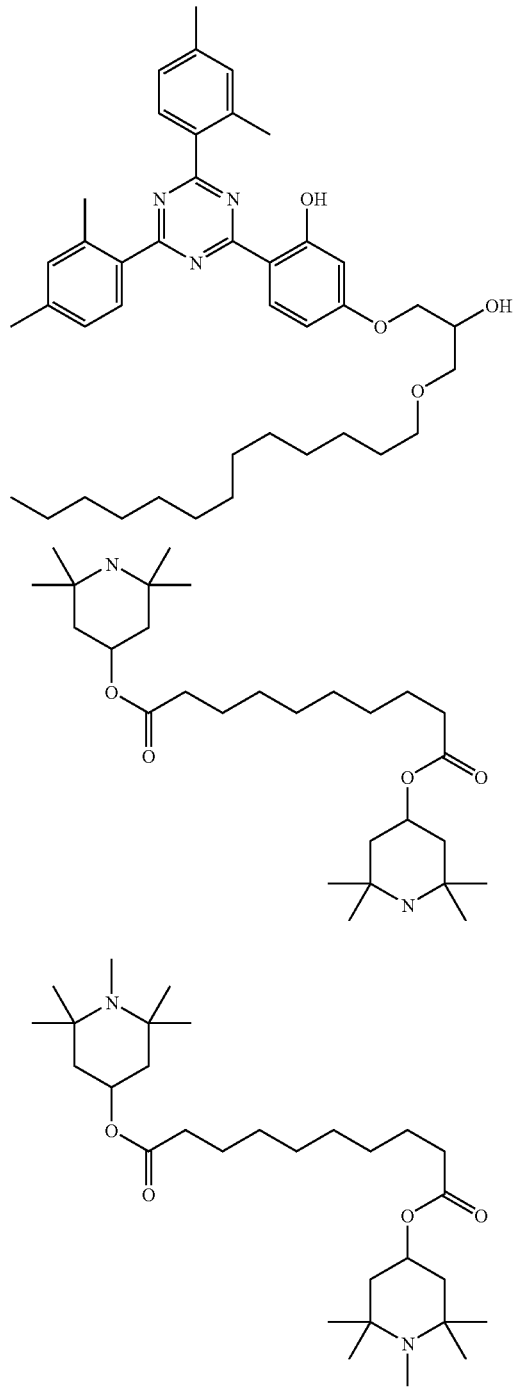

Above and below, percentages are per cent by weight. All temperatures are given in degrees Celsius. m.p. denotes melting point, cl.p. denotes clearing point. Furthermore, C=crystalline state, N=nematic phase, S=smectic phase and I=isotropic phase. $S_C$ denotes a smectic C phase. The data between these symbols represent the transition temperatures. $V_{10}$ denotes the voltage for 10% transmission (viewing angle perpendicular to the plate surface). $t_{on}$ denotes the switch-on time and $t_{off}$ the switch-off time at an operating voltage corresponding to 2.0 times the value of $V_{10}$. $\Delta n$ denotes the optical anisotropy ($\Delta n = n_e - n_o$, where $n_e$ is the refractive index of the extraordinary ray and $n_o$ is the refractive index of the ordinary ray) (589 nm, 20° C.). $\Delta \epsilon$ denotes the dielectric anisotropy ($\Delta \epsilon = \epsilon_\| - \epsilon_\perp$, where $\epsilon_\|$ denotes the dielectric constant parallel to the longitudinal molecular axes and $\epsilon_\perp$ denotes the dielectric constant perpendicular thereto) (1 kHz, 20° C.). The electro-optical data were measured in a TN cell at the 1st minimum (i.e. at a d·Δn value of 0.5 μm) at 20° C., unless expressly stated otherwise. The optical data were measured at 20° C., unless expressly stated otherwise. The flow viscosity $v_{20}$ (mm$^2$/sec) was determined at 20° C. The rotational viscosity $\gamma_1$ [mPa·s] was likewise determined at 20° C. SR denotes the specific resistance [Ω.cm]. The voltage holding ratio VHR was determined under thermal load at 100° C. or with UV irradiation (wavelength>300 nm; irradiation intensity 765 W/m$^2$) for 2 hours. The physical parameters were determined experimentally as described in "Licristal, Physical Properties Of Liquid Crystals, Description of the Measurement Methods", Ed. W. Becker, Merck KGaA, Darmstadt, revised edition, 1998.

The following examples are intended to explain the invention without restricting it.

EXAMPLES

Example 1 a) Without a compound of the formula II: mixture M1

| | | |
|---|---|---|
| CCP-2OCF3•F | 14.00% | S→N [° C.]: <−30 |
| CCP-2F•F•F | 10.00% | Clearing point [° C.]: +85 |
| CCP-3F•F•F | 14.00% | $n_e$ [589 nm; 20° C.]: 1.5468 |
| CCP-5F•F•F | 6.00% | $n_o$ [589 nm; 20° C.]: 1.4707 |
| CCZU-2-F | 4.00% | Δn [589 nm; 20° C.]: +0.0761 |
| CCZU-3-F | 17.00% | $\epsilon_\parallel$ [1 kHz; 20° C.]: 15.3 |
| CCZU-5-F | 4.00% | $\epsilon_\perp$ [1 kHz; 20° C.]: 4.3 |
| CGU-2-F | 6.00% | Δε [1 kHz; 20° C.]: +11.0 |
| CGZP-2-OT | 8.00% | VHR (100° C.): 94.6 |
| CCH-5CF3 | 8.00% | VHR (2 h UV irrad.): 92.3 |
| CCOC-4-3 | 3.00% | |
| CCOC-3-3 | 3.00% | |
| CCOC-3-5 | 3.00% | | b) With a compound of the formula II:

Various amounts of a compound of the formula II were added to the above mixture M1, and the VHR was determined after UV irradiation for 2 hours:

| Mixture | VHR (2 h UV irradiation) [%] |
|---|---|
| M1 without a compound of the formula II | 92.3 |
| M1 + 0.60% by wt. of PYGP-4-3 | 94.7 |
| M1 + 0.62% by wt. of YGGP-4-3 | 94.9 |
| M1 + 0.69% by wt. of PYGP-4-4 | 95.0 |

Example 2 a) Without a compound of the formula II: mixture M2

| | | |
|---|---|---|
| GGP-3-CL | 9.00% | S→N [° C.]: <−20 |
| GGP-5-CL | 24.00% | Clearing point [° C.]: +100 |
| PGIGI-3-F | 4.00% | $n_e$ [589 nm; 20° C.]: 1.7162 |
| BCH-3F•F | 4.00% | $n_o$ [589 nm; 20° C.]: 1.5161 |
| BCH-5F•F | 5.00% | Δn [589 nm; 20° C.]: +0.2001 |
| BCH-3F•F•F | 9.00% | $\epsilon_\parallel$ [1 kHz; 20° C.]: 16.9 |
| BCH-5F•F•F | 10.00%% | $\epsilon_\perp$ [1 kHz; 20° C.]: 4.6 |
| CBC-33F | 3.00% | Δε [1 kHz; 20° C.]: +12.3 |
| CBC-53F | 4.00% | $k_1$ [pN]: 14.5 |
| CCG-V-F | 6.00% | $k_3$ [pN]: 15.3 |
| PGU-2-F | 6.00% | $k_3/k_1$: 1.05 |
| PGU-3-F | 7.00% | $\gamma_1$ [mPa·s; 20° C.]: 327 |
| FET-2CL | 5.00% | $V_{10}$ [V]: 1.15 |
| FET-3CL | 4.00% | | b) With a compound of the formula II:

Various amounts of a compound of the formula II were added to the above mixture M2, and the VHR was determined after UV irradiation for 2 hours:

| Mixture | VHR (2 h UV irradiation) [%] |
|---|---|
| M2 without a compound of the formula II | 96.0 |
| M2 + 0.53% by wt. of PYGP-4-3 | 97.1 |
| M2 + 0.99% by wt. of PYGP-4-3 | 97.5 |
| M2 + 1.51% by wt. of PYGP-4-3 | 97.6 |
| M2 + 1.98% by wt. of PYGP-4-3 | 97.3 |

Example 3 a) Without a compound of the formula II: mixture M3

| | | |
|---|---|---|
| CC-5-V | 10.00% | Clearing point [° C.]: +55 |
| PCH-53 | 30.00% | $n_e$ [589 nm; 20° C.]: 1.5545 |
| CCP-2F.F.F | 15.00% | $n_o$ [589 nm; 20° C.]: 1.4837 |
| CCP-3F.F.F | 15.00% | Δn [589 nm; 20° C.]: +0.0708 |
| CCP-5F.F.F | 10.00% | $\epsilon_\parallel$ [1 kHz; 20° C.]: 6.8 |
| CCP-31 | 10.00% | $\epsilon_\perp$ [1 kHz; 20° C.]: 3.0 |
| CCG-V-F | 10.00% | Δε [1 kHz; 20° C.]: +3.8 | b) With a compound of the formula II:

20% by weight of PUQU-3-F (=mixture M3A) and various amounts of a compound of the formula II were added to the above mixture M3, and the VHR was determined after UV irradiation for 2 hours:

| Mixture | VHR (2 h UV irradiation) [%] |
|---|---|
| M3A without a compound of the formula II | 94.2 |
| M3 + 0.5% by wt. of PYGP-4-3 | 96.4 |
| M3 + 1.0% by wt. of PYGP-4-3 | 96.4 |

Furthermore, the specific resistance SR of mixture M3A without and with addition of a compound of the formula II was determined in a glass cell after UV irradiation:

| Mixture | SR [Ω·cm] after 0 h | SR [Ω·cm] after 10 h | SR [Ω·cm] after 50 h |
|---|---|---|---|
| M3A without a compound of the formula II | $3.5 \cdot 10^{14}$ | $2 \cdot 10^{13}$ | $4 \cdot 10^{10}$ |
| M3A + 0.5% by wt. of PYGP-4-3 | $1.0 \cdot 10^{14}$ | $1.5 \cdot 10^{14}$ | $6 \cdot 10^{12}$ |
| M3A + 1.0% by wt. of PYGP-4-3 | $1.0 \cdot 10^{14}$ | $1.7 \cdot 10^{14}$ | $3 \cdot 10^{13}$ |
| M3A + 1.0% by wt. of PGP-2-2 | $1.3 \cdot 10^{14}$ | $1.0 \cdot 10^{14}$ | $2.5 \cdot 10^{12}$ |

-continued

| Mixture | SR [Ω·cm] after 0 h | SR [Ω·cm] after 10 h | SR [Ω·cm] after 50 h |
|---|---|---|---|
| M3A + 1.0% by wt. of GGP-5-3 | $2.5 \cdot 10^{14}$ | $7 \cdot 10^{13}$ | $1.5 \cdot 10^{12}$ |

Example 4 a) Without a compound of the formula II: mixture M4

| | | | |
|---|---|---|---|
| CCH-35 | 3.00% | | |
| CC-3-V1 | 4.00% | Clearing point [° C.]: | +84 |
| CCP-1F•F•F | 10.00% | $n_e$ [589 nm; 20° C.]: | 1.5672 |
| CCP-2F•F•F | 8.00% | $n_o$ [589 nm; 20° C.]: | 1.4745 |
| CCP-3F•F•F | 9.00% | Δn [589 nm; 20° C.]: | +0.0927 |
| CCP-2OCF3•F | 12.00% | $\epsilon_\parallel$ [1 kHz; 20° C.]: | 15.4 |
| CCP-2OCF3 | 8.00% | $\epsilon_\perp$ [1 kHz; 20° C.]: | 4.0 |
| CCP-3OCF3 | 8.00% | Δε [1 kHz; 20° C.]: | +11.5 |
| CCP-4OCF3 | 5.00% | $\gamma_1$ [mPa·s; 20° C.]: | 132 |
| CCP-5OCF3 | 7.00% | | |
| PUQU-2-F | 6.00% | | |
| PUQU-3-F | 9.50% | | |
| CGU-2-F | 3.50% | | |
| CCGU-3-F | 5.00% | | |
| CBC-33 | 2.00% | | | b) With a compound of the formula II:

Various amounts of a compound of the formula II were added to the above mixture M4, and the VHR was determined after UV irradiation for 2 hours:

| Mixture | VHR (2 h UV irradiation) [%] |
|---|---|
| M4 without a compound of the formula II | 95.8 |
| M4 + 0.5% by wt. of PYGP-4-3 | 96.6 |
| M4 + 1.0% by wt. of PYGP-4-3 | 97.2 |

Furthermore, the specific resistance SR of mixture M4 without and with addition of a compound of the formula II was determined in a glass cell after UV irradiation:

| Mixture | SR [Ω·cm] after 0 h | SR [Ω·cm] after 10 h | SR [Ω·cm] after 50 h |
|---|---|---|---|
| M4 without a compound of the formula II | $1.0 \cdot 10^{14}$ | $2.2 \cdot 10^{13}$ | $3 \cdot 10^{10}$ |
| M4 + 0.5% by wt. of PYGP-4-3 | $1.3 \cdot 10^{14}$ | $1.6 \cdot 10^{14}$ | $2 \cdot 10^{13}$ |
| M4 + 1.0% by wt. of PYGP-4-3 | $2.0 \cdot 10^{14}$ | $2.3 \cdot 10^{14}$ | $1.2 \cdot 10^{14}$ |

The invention claimed is:

1. A liquid-crystalline medium comprising at least one compound of formula I

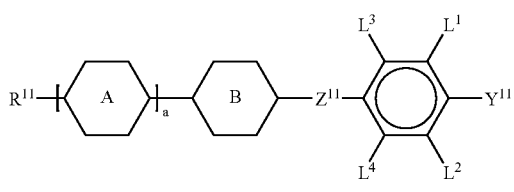

and at least one compound of formula II

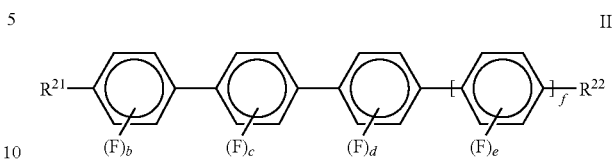

in which $L^1, L^2, L^3$ and $L^4$ are each, independently of one another, H or F;

$R^{11}$ is H, a halogenated or unsubstituted alkyl radical having from 1 to 15 carbon atoms, where, in addition, one or more $CH_2$ groups in these radicals may each be replaced, independently of one another, by —C≡C—, —CH=CH—, —O—, —CO—O— or —O—CO— in such a way that O atoms are not linked directly to one another;

$R^{21}$ and $R^{22}$ are each, independently of one another, H, Cl, F, CN, $SF_5$, SCN, NCS, a halogenated or unsubstituted alkyl radical having from 1 to 15 carbon atoms, where, in addition, one or more $CH_2$ groups in these radicals may each be replaced, independently of one another, by —C≡C—, —CH=CH—, —O—, —CO—O— or —O—CO— in such a way that O atoms are not linked directly to one another;

$Y^{11}$ is F, Cl, CN, $SF_5$, SCN, NCS, a halogenated alkyl radical, a halogenated alkenyl radical, a halogenated alkoxy radical or a halogenated alkenyloxy radical, each having up to 6 carbon atoms;

$Z^{11}$ is a single bond, a, is 1;

b, c, d and e are each, independently of one another, 0, 1 or 2;

f is 1;

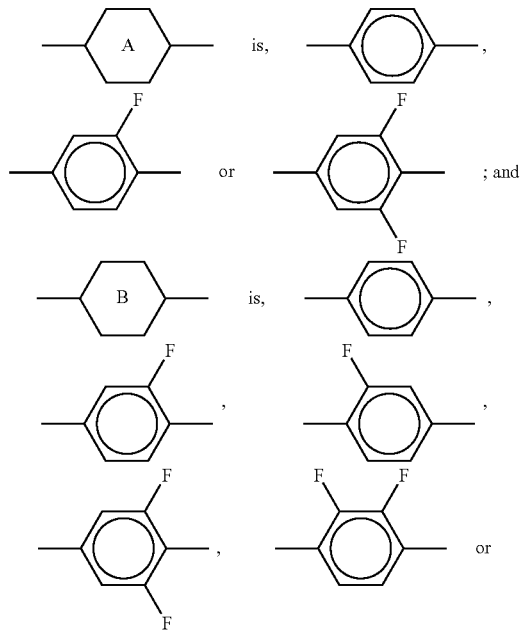

-continued

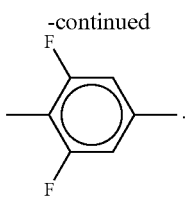

2. The liquid-crystalline medium according to claim 1, wherein the proportion of the compounds of the formula II in the mixture as a whole is from 0.1 to 10% by weight.

3. An electro-optical liquid-crystal display containing a liquid-crystalline medium according to claim 1.

4. The liquid-crystalline medium according to claim 1 wherein the proportion of the compounds of formula II in the mixture as a whole is 0.25 to 5% by weight.

5. The liquid-crystalline medium according to claim 1 wherein the proportion of the compounds of formula II in the mixture as a whole is 0.5 to 2% by weight.

6. The liquid crystalline medium according to claim 1, wherein the compound of formula I is

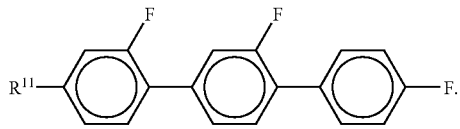

7. The liquid crystalline medium according to claim 1, wherein the compound of formula I is

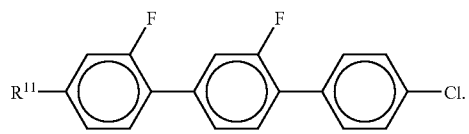

8. The liquid crystalline medium according to claim 1, wherein the compound of formula I is

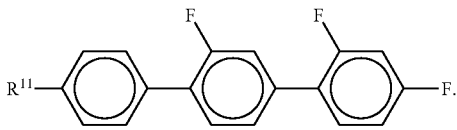

9. The liquid crystalline medium according to claim 1, wherein the compound of formula I is

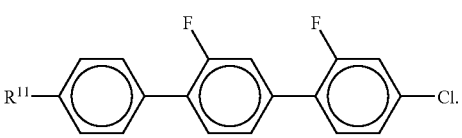

10. The liquid crystalline medium according to claim 1, wherein the compound of formula II is

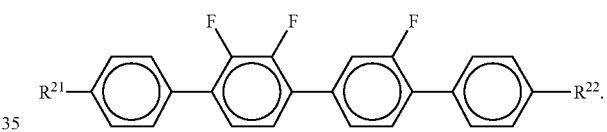

* * * * *

UNITED STATES PATENT AND TRADEMARK OFFICE
CERTIFICATE OF CORRECTION

| | | |
|---|---|---|
| PATENT NO. | : 7,678,431 B2 | Page 1 of 1 |
| APPLICATION NO. | : 11/739537 | |
| DATED | : March 16, 2010 | |
| INVENTOR(S) | : Manabe et al. | |

It is certified that error appears in the above-identified patent and that said Letters Patent is hereby corrected as shown below:

Title Page

Section (22) should read -- PCT Filed: September 25, 2003 --

After Section (22), should read -- (86) EP PCT/EP03/10680 --.

After Section (65), should read -- (30) October 15, 2002 DE 102 47 986.0 --

Signed and Sealed this
Twelfth Day of July, 2011

David J. Kappos
*Director of the United States Patent and Trademark Office*